US010442994B2

(12) United States Patent
Eckert et al.

(10) Patent No.: US 10,442,994 B2
(45) Date of Patent: Oct. 15, 2019

(54) LIQUID CRYSTAL ALIGNMENT COMPOSITION, LIQUID CRYSTAL ALIGNMENT FILM AND LIQUID CRYSTAL DISPLAY ELEMENT

(71) Applicant: ROLIC AG, Zug (CH)

(72) Inventors: Jean-François Eckert, Kientzville (FR); Satish Palika, Zofingen (CH); Martin Roth, Holstein (CH); Qian Tang, Oberwil (CH)

(73) Assignee: ROLIC AG, Zug (CH)

( * ) Notice: Subject to any disclaimer, the term of this patent is extended or adjusted under 35 U.S.C. 154(b) by 373 days.

(21) Appl. No.: 15/119,934

(22) PCT Filed: Feb. 12, 2015

(86) PCT No.: PCT/EP2015/052913
§ 371 (c)(1),
(2) Date: Aug. 18, 2016

(87) PCT Pub. No.: WO2015/124483
PCT Pub. Date: Aug. 27, 2015

(65) Prior Publication Data
US 2017/0058200 A1 Mar. 2, 2017

(30) Foreign Application Priority Data
Feb. 19, 2014 (EP) ..................................... 14155690

(51) Int. Cl.
*C09K 19/56* (2006.01)
*C08G 73/10* (2006.01)
*G02F 1/1337* (2006.01)
*C09D 179/08* (2006.01)

(52) U.S. Cl.
CPC .......... *C09K 19/56* (2013.01); *C08G 73/1025* (2013.01); *C09D 179/08* (2013.01); *G02F 1/133723* (2013.01); *G02F 1/133788* (2013.01)

(58) Field of Classification Search
CPC ..................................................... C09K 19/56
USPC ........................................................ 524/600
See application file for complete search history.

(56) References Cited

U.S. PATENT DOCUMENTS

| 5,389,698 A | 2/1995 | Chigrinov et al. |
| 5,602,661 A | 2/1997 | Schadt et al. |
| 5,838,407 A | 11/1998 | Chigrinov et al. |
| 6,027,772 A | 2/2000 | Han |
| 6,066,696 A | 5/2000 | Yu et al. |
| 6,160,597 A | 12/2000 | Schadt et al. |
| 6,215,539 B1 | 4/2001 | Schadt et al. |
| 6,300,991 B1 | 10/2001 | Schadt et al. |
| 6,303,742 B1 | 10/2001 | Okada et al. |
| 6,307,002 B1 | 10/2001 | Okada et al. |
| 6,340,506 B1 | 1/2002 | Buchecker et al. |
| 6,608,661 B1 | 8/2003 | Schadt et al. |
| 6,717,644 B2 | 4/2004 | Schadt et al. |
| 6,919,404 B2 * | 7/2005 | Gibbons ............. C08F 283/045 525/180 |
| 8,173,749 B2 | 5/2012 | Bachels et al. |
| 2006/0194000 A1 | 8/2006 | Schadt et al. |
| 2010/0047482 A1 | 2/2010 | Kim et al. |
| 2010/0266814 A1 * | 10/2010 | Bury ................. G02F 1/133788 428/156 |
| 2012/0316317 A1 | 12/2012 | Eckert et al. |
| 2013/0158208 A1 * | 6/2013 | Yang ..................... C08G 73/16 525/421 |
| 2013/0165598 A1 * | 6/2013 | Yoo ................... G02F 1/133788 525/421 |
| 2014/0199498 A1 | 7/2014 | Shin et al. |

FOREIGN PATENT DOCUMENTS

| JP | 2008-214413 A | 9/2008 |
| JP | 2008-222937 A | 9/2008 |
| WO | 99/15576 A1 | 4/1999 |
| WO | 99/49360 A1 | 9/1999 |
| WO | 99/51662 A1 | 10/1999 |
| WO | 2009/091225 A2 | 7/2009 |
| WO | 2011/098461 A1 | 8/2011 |

OTHER PUBLICATIONS

Vladimir G. Chigrinov, et al., "Photoalignment of Liquid Crystalline Materials: Physics and Applications", Wiley-SID Series in Display Technology, John Wiley & Sons, Ltd., 2008, pp. 1-2.
Oleg Yaroshchuk, et al., "Photoalignment of liquid crystals: basics and current trends", Journal of Materials Chemistry, 2012, pp. 286-300, vol. 22.
International Search Report of PCT/EP2015/052913, dated Apr. 30, 2015. [PCT/ISA/210].

* cited by examiner

Primary Examiner — Jane L Stanley
(74) Attorney, Agent, or Firm — Sughrue Mion, PLLC

(57) ABSTRACT

The present invention relates to a photo-alignment composition for the alignment of liquid crystals. Further the present invention relates to the liquid crystal alignment film and coating layer prepared from the said composition and the use to fabricate optical and electrooptical elements and devices.

13 Claims, No Drawings

LIQUID CRYSTAL ALIGNMENT COMPOSITION, LIQUID CRYSTAL ALIGNMENT FILM AND LIQUID CRYSTAL DISPLAY ELEMENT

Liquid crystal displays (LCD's) are currently dominating the field of visualization of electronic information. They have found widespread use in automotive and telecommunication devices, in monitors for computer, laptops and tablet PC's and in smart phones and digital cameras. Recently developed LCD's are characterized by fast response times, wide viewing angles, high luminance and high contrast ratios.

In the preparation of LCD devices the method of alignment of the liquid crystal molecules plays a crucial role. Usually an alignment layer which is in contact with the liquid crystal molecules provides for the pre-defined alignment direction and pre-tilt angle of the LC molecules.

Methods for the preparation of these alignment layers are known to the specialists in the field. Conventionally a thin polymer layer on the LCD glass substrates, mostly a polyimide type polymer, is uniaxially rubbed by a special cloth. However, this method has a series of drawbacks, as for instance the formation of dust which interferes with the integrated electronics and also the formation of scratches which leads to problems in the manufacture of high resolution displays. Furthermore, the rubbing process renders the production of structured alignment layers very difficult.

Such disadvantages can be avoided by replacing the rubbing process by the photoalignment method, using a thin polymer layer which is irradiated with polarized light and thus induces the alignment direction in the LC molecules, see for example "Photoalignment of Liquid Crystalline Materials: Physics and Applications", by V. G. Chigrinov, V. M. Kozenkov, Hoi-S. Kwok, Wiley-SID Series in Display Technology, John Wiley & Sons, Ltd, 2008, and references cited therein. Photoalignment is nowadays an established technology in the production of VA (Vertical Alignment)-LCD's. In order to fulfil the current display performance requirements the alignment materials must satisfy various material characteristics, the most important being:

High voltage holding (retention) ratio (VHR).
Low alignment energy profile (short irradiation time or low irradiation energy).
Reduced AC image sticking.

Concerning voltage retention an electrical charge is applied to the pixel electrodes during a short time period and subsequently must not be drained away due to the resistance of the liquid crystal material. The ability to hold the charge and avoid the voltage drop is quantified by the so-called "voltage holding ratio" (VHR). It is the ratio of the RMS-voltage (root mean square voltage) at a pixel within one frame period and the initial value of the voltage applied. Photoalignment materials with improved VHR are e.g. described in WO-A-99/49360, U.S. Pat. Nos. 6,066,696, 6,027,772, WO-A-99/15576 and WO-A-99/51662. In WO-A-99/49360, U.S. Pat. Nos. 6,066,696, 6,027,772 and 8,173,749 blends of polymeric compounds are described, containing photoalignment polymers and polyimides.

Currently most preferred materials for alignment films for the rubbing method or the photoalignment method are resins from the class of polyimides, which are derived from the corresponding polyamic acid resins. These polyimides are known for their outstanding physical properties, such as heat resistance, affinity to the liquid crystal materials and mechanical strength. In the case of polyimides for the photoalignment method, the photo-alignment material composition comprises not only photoactive polymer and solvents but also other non-photoactive polymers and additives to fine-tune and optimize the final formulation for manufacturing liquid crystal displays with good performance.

US patent application No. 2010//0266814 A1 describes a photoalignment composition comprising at least one photoreactive compound (I) that contains photoalignment groups and at least one compound (II) that does not contain a photoalignment group. But there is an ever growing demand from display industry to develop economical photo-alignment material compositions for use in liquid crystal displays. The non-photopolymer used should not have any adverse effects on performance of the final photo-alignment composition. Therefore it is required that the non-photopolymer should have very good electrical characteristics, for example high voltage holding ratio. Another important requirement is when the non-photopolymer is mixed together with the photoactive polymer to use as photo-alignment composition, it should not disturb the liquid crystal alignment information imparted by the photoactive polymer.

Surprisingly, the present inventors have found that non-photopolymers from the class of polyimide and/or polyamic acid compounds, comprising repeating structural units from diamines carrying at least two phenolic OH-groups, provide excellent electrical performance such as high voltage holding ratio and good liquid crystal alignment characteristics to the liquid crystal alignment layer when these polymers are mixed together with photoactive polymers comprising photoalignment groups.

Compositions comprising polyimide and/or polyamic acid compounds, comprising repeating structural units from diamines carrying phenolic OH-groups have been described in the Japanese patent application JP 2008/222 937 for the use in photosensitive resin compositions using photoacid generating agents. They cannot be used in photoalignment compositions of the present invention due to their corrosive nature.

The photoalignment composition of the present invention comprises:

a) at least one polyimide and/or polyamic acid compound (I) represented by the general Formula 1, comprising repeating structural units (1) and/or (2)

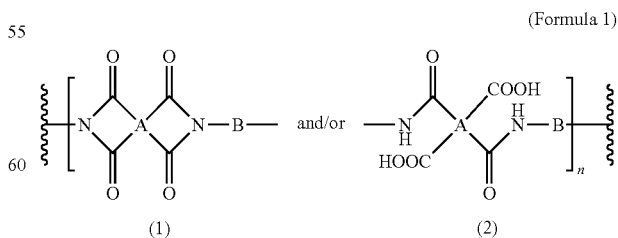

(Formula 1)

and/or a repeating structural unit represented by the general Formula 2, comprising repeating structural units (3) and/or (4)

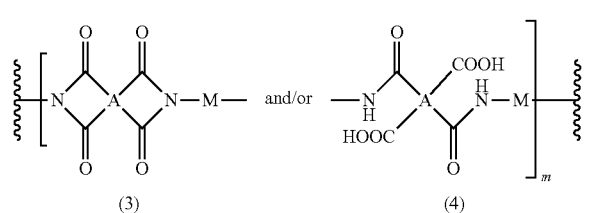

(Formula 2)

where

A is a tetravalent organic residue of a tetracarboxylic dianhydride,

B is the divalent residue of a substituted or unsubstituted non-aromatic or aromatic diamine $NH_2$—B—$NH_2$ without phenolic OH-groups, M is the divalent residue of a substituted or unsubstituted aromatic diamine $NH_2$-M-$NH_2$ carrying at least two phenolic OH-groups, n and m are integers and the sum n+m has a value from 10 to 200, where m is greater than 0 and n is equal to 0 or greater than 0, under the proviso that at least 5 weight % of the aromatic diamine carrying phenolic OH-groups $NH_2$-M-$NH_2$ are present in 100 weight % of compound (I), b) at least one photoactive compound (II) comprising photoalignment groups, c) a solvent or solvent mixture, d) optionally at least one additive.

In general the amount of compound (I) is 50%-99.5% by weight of the sum of weights of compound (I) and compound (II), preferably 70% to 99% by weight and most preferably 80% to 98% by weight.

Compound (I) is an oligomer or polymer comprising an acid anhydride structural unit derived form an tetracarboxylic acid anhydride, an amine structural unit derived from a diamine carrying at least two phenolic OH-groups and optionally an amine structural unit derived from a diamine without phenolic OH-groups. Therefore compound (I) is always carrying phenolic OH-groups in its molecular structure. If only one molecular type of dianhydride structural units and one molecular type of diamine structural units are present the polymer is called a homopolymer. If several different dianhydride structural units and/or several different diamine structural units are present it is called a copolymer. Furthermore the main chain molecular structure comprises repeating amic acid units and imide units, whereby the imide units are derived from primarily formed auric acid units by a cyclisation reaction with concomitant cleavage of water molecules. The ratio of amic acid units to imide units depends on the reaction conditions, but generally high temperatures have to be applied to evoke cyclisation or additionally dehydrating agents such as acetic anhydride have to be used. Under the standard conditions of the polymer synthesis at relatively low temperatures of about −10° C. to 80° C. the polymer compound (I) is obtained mainly in the polyamic acid form.

After the composition of the present invention has been coated on a substrate surface to provide an alignment layer for the photoalignment of liquid crystals, a heat treatment step in the temperature range of 80° C. to 230° C. is usually performed, converting most of the polyamic acid structural units to polyimide structural units.

Compound (I) is formed by polymerizing at least one tetracarboxylic dianhydride with at least one diamine $NH_2$-M-$NH_2$ carrying phenolic OH-groups and optionally one or several diamines $NH_2$—B—$NH_2$ without phenolic OH-groups. The amount of the diamine $NH_2$-M-$NH_2$ carrying phenolic OH-groups in compound (I) is at least 5% by weight relative to the total weight of compound (I). Therefore at least 5% by weight of diamine $NH_2$-M-$NH_2$ relative to the sum of amounts of dianhydride and all diamines are to be used in the synthesis of compound (I). Due to the nature of the polymerization reaction, polymer chains with different numbers (n+m) of repeating structural units are obtained, leading to a distribution of chain lengths, and taking into account the different molecular weights of the A, B and M residues, to a distribution of polymer molecular weights. Although it is possible to measure this distribution with gel permeation chromatography (GPC), it is more convenient to determine the intrinsic viscosity [η] of a 0.5% by weight solution of the polymer compound (I) as a relative measure of the average molecular weight. The intrinsic viscosity [η] should be in the range of 0.20-1.0 dl/g, more preferably 0.20-0.80 dl/g.

The average sum (n+m) of repeating structural units is an integer of 10 to 200, and if the compound (I) is not comprising residues of the diamine $NH_2$—B—$NH_2$ without phenolic OH-groups, n is 0. The integer m is always greater than 0 and in the case of n being greater than zero, where compound (I) is a copolymer, m is chosen such as to provide at least 5% by weight relative to 100% by weight of compound (I) of the diamine $NH_2$-M-$NH_2$ carrying phenolic groups.

If the molecular weight of compound (I) is too small, that means if (n+m) is below 10, the derived alignment film or coating layer from the composition shows inferior electrical, thermal and mechanical properties. If (n+m) is greater than 200, the viscosity of the inventive composition becomes too high, making the handling and further application very difficult. The diamines $NH_2$—B—$NH_2$ without phenolic OH-groups with 6-40 C atoms are not especially limited and belong to the classes of aliphatic, cycloaliphatic and aromatic diamines. Many of them are known to the specialists in the field of liquid crystal alignment materials and are used as monomers or comonomers to prepare liquid crystal alignment films for the rubbing method or the photoalignment technique. They can be used alone or in a combination of two or more.

The aromatic diamines are preferred.

Examples of aliphatic and cycloaliphatic diamines $NH_2$—B—$NH_2$ include (not limited):
  trimethylene diamine;
  tetramethylene diamine;
  hexamethylene diamine;
  octamethylene diamine;
  1,4-diaminocyclohexan;
  4,4'-methylenebis(cyclohexylamin);
  4,4'-methylenebis(2-methylcyclohexylamine);
  1,3-bis(aminomethyl)benzene;
  1,4-bis(aminomethyl)benzene;
  isophorone diamine;
  tetrahydrodicyclopentadienylene diamine;
  1,3-adamantanediamine;

Examples of the preferred aromatic diamines $NH_2$—B—$NH_2$ include (not limited):
  m-phenylenediamine;
  p-phenylenediamine;
  1,5-diaminonaphthalene;
  4,4'-diaminodiphenyl ether;
  3,4'-diaminodiphenyl ether;
  4,4'-diaminodiphenyl sulfide;

4,4-diamino-2,2'-dichlorodiphenyl disulphide;
4,4'-diaminodiphenyl sulfone;
3,3'-diaminodiphenyl sulfone;
4,4'-diaminodiphenylmethane;
3,3'-diaminodiphenylmethane;
3,4'-diaminodiphenylmethane;
4,4'-diamino-3,3'-dimethyldiphenyl methane;
4,4'-diaminodiphenylethane;
3,3'-diaminobenzophenone;
4,4'-diaminobenzophenone;
3,4'-diaminobenzophenone;
2,2-bis(4-aminophenyl)hexafluoropropane;
2,2-bis[4-(4-aminophenoxy)phenyl]hexafluoropropane;
2,2-bis[4-(4-aminophenoxy)phenyl]propane;
1,4-bis(4-aminophenoxy)benzene;
1,3-bis(4-aminophenoxy)benzene;
4,4'-diamino-diphenylene-cycylohexane;
3,5-diamino-3'-trifluormethylbenzanilide;
3,5-diamino-4'-trifluormethylbenzanilide;
4,4'-diaminobenzanilide;

Diaminofluorene derivatives, such as 2,7-diaminofluorene; 9,9-bis(4-aminophenyl)fluorene;

Diaminoanthraquinone derivatives, such as 1,5-diaminoanthraquinone;

Benzidine derivatives such as 4,4'-diaminobiphenyl; 4,4'-Diamino-3,3'-dimethylbiphenyl; 4,4'-diamino-2,2'-dimethylbiphenyl; tetramethylbenzidine; 4,4'-diamino-2,2'-bis(trifluoromethyl)biphenyl; 2,2',5,5'-tetrachloro-4,4'-diaminobiphenyl; 2,2'-dichloro-4,4'-diamino-5,5'-dimethoxybiphenyl; 3,3'-dimethoxy-4,4'-diaminobiphenyl;
5-amino-1-(4'-aminophenyl)-1,3,3-trimethylindan;
6-amino-1-(4'-aminophenyl)-1,3,3-trimethylindan;
4,4'-methylene-bis(2-chloroaniline);
4,4'-(p-phenyleneisopropylidene)bisaniline;
4,4'-(m-phenyleneisopropylidene)bisaniline;
bis(4-aminophenoxy)-2,2-dimethylpropane;

Examples of the more preferred aromatic diamines NH$_2$—B—NH$_2$ include (not limited):
m-phenylenediamine;
p-phenylenediamine;
1,5-diaminonaphthalene;
4,4'-diaminodiphenyl ether;
4,4'-diaminodiphenyl sulphide;
4,4'-diaminodiphenyl sulfone;
4,4'-diaminodiphenylmethane;
4,4'-diaminodiphenylethane;
2,2-bis(4-aminophenyl)hexafluoropropane;
2,2-bis[4-(4-aminophenoxy)phenyl]hexafluoropropane;
2,2-bis[4-(4-aminophenoxy)phenyl]propane;
1,4-bis(4-aminophenoxy)benzene;
1,3-bis(4-aminophenoxy)benzene;
2,7-diaminofluorene;
4,4'-diaminobiphenyl;
4,4'-Diamino-3,3'-dimethylbiphenyl;
4,4'-diamino-2,2'-dimethylbiphenyl;
4,4'-(p-phenyleneisopropylidene)bisaniline;
4,4'-(m-phenyleneisopropylidene)bisaniline;
bis(4-aminophenoxy)-2,2-dimethylpropane.

Especially preferred aromatic diamines NH$_2$—B—NH$_2$ are:
p-phenylenediamine;
4,4'-diaminodiphenyl ether;
4,4'-diaminodiphenyl sulfide;
4,4'-diaminodiphenylmethane;
4,4'-diaminodiphenylethane;
2,2-bis[4-(4-aminophenoxy)phenyl]propane;
1,4-bis(4-aminophenoxy)benzene;
1,3-bis(4-aminophenoxy)benzene;
4,4'-Diamino-3,3'-dimethylbiphenyl;
4,4'-diamino-2,2'-dimethylbiphenyl;
4,4'-(p-phenyleneisopropylidene)bisaniline;
4,4'-(m-phenyleneisopropylidene)bisaniline;
bis(4-aminophenoxy)-2,2-dimethylpropane.

The diamines NH$_2$-M-NH$_2$ carrying at least two phenolic OH-groups are aromatic diaminophenols comprising two or three benzene rings in the molecular structure as represented in the Formula 3. They can be used alone or in a combination of two or more.

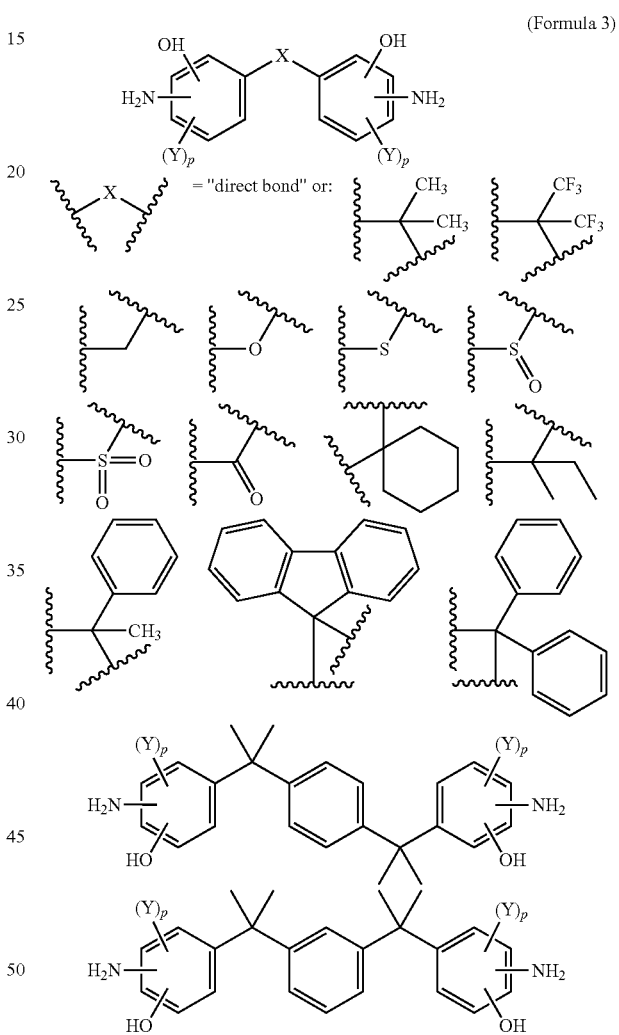

(Formula 3)

where X represents a divalent bridging group, being either a direct bond or a group chosen from the following formulas:
—CH$_2$—, —C(CH$_3$)$_2$—, —C(CF$_3$)—, —O—, —S—, —SO—, —SO$_2$— —CO—,

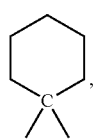

—C(CH₃)(C₂H₅)—,

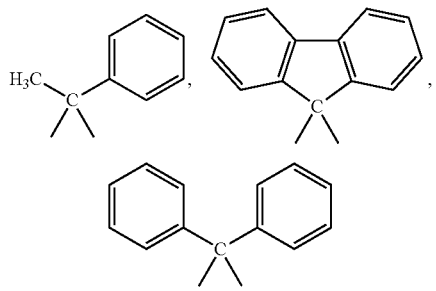

and Y represents a hydrogen atom, $C_1$-$C_4$ alkyl group, $C_1$-$C_4$ alkoxy group, halogen (Cl, F, Br and I) and p represents an integer from 1-3.

The phenolic OH-groups can be in ortho-, meta- or para-position relative to the bridging group X and the two amino groups can be in ortho- or meta-position relative to the phenolic OH-groups.

Preferred are bis-o-aminophenols carrying at least two phenolic OH-groups and comprising two or three benzene rings in the molecular structure, where the phenolic OH-groups are in para-position relative to the bridging group X and the amino groups are in ortho-position relative to the phenolic OH-groups, as represented in Formula 4.

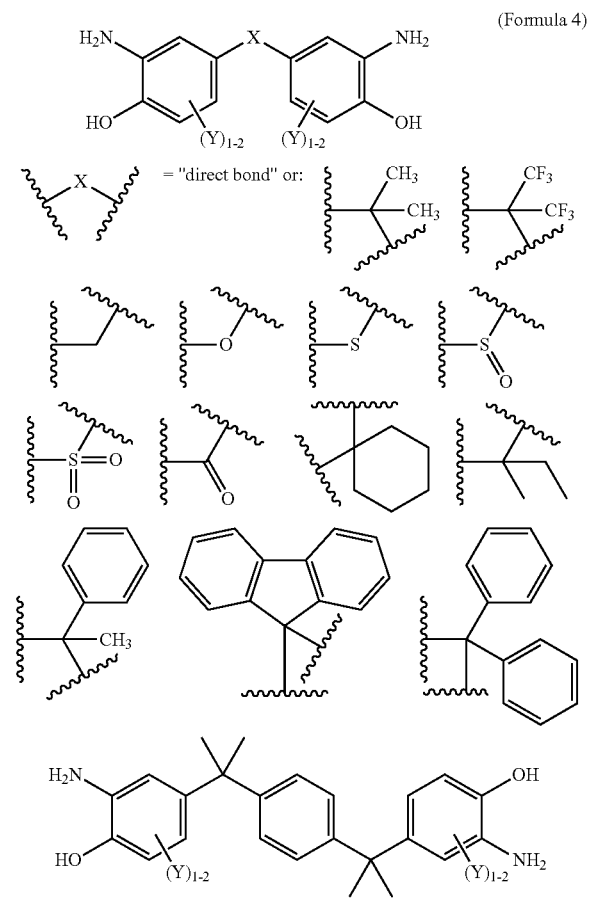

(Formula 4)

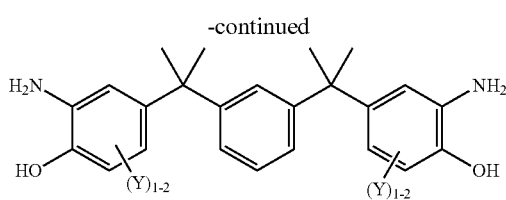

where X represents a divalent bridging group, being either a direct bond or a group chosen from the following formulas:

—CH₂—, —C(CH₃)₂—, —C(CF₃)—, —O—, —S—, —SO—, —SO₂—, —CO—,

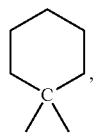

—C(CH₃)(C₂H₅)—,

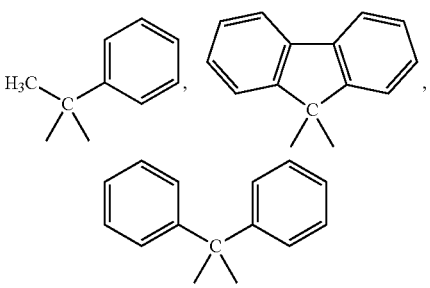

and Y represents a hydrogen atom, $C_1$-$C_4$ alkyl group, $C_1$-$C_4$ alkoxy group, halogen (Cl, F, Br).

Most preferred diamines NH₂-M-NH₂ are bis-o-aminophenols having the following structures represented in Formula 5:

(Formula 5)

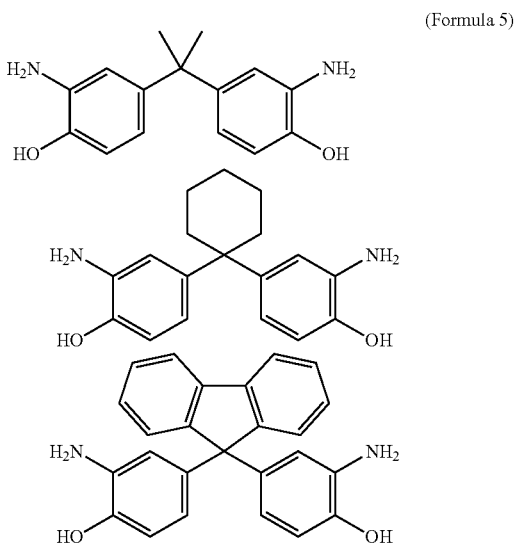

-continued

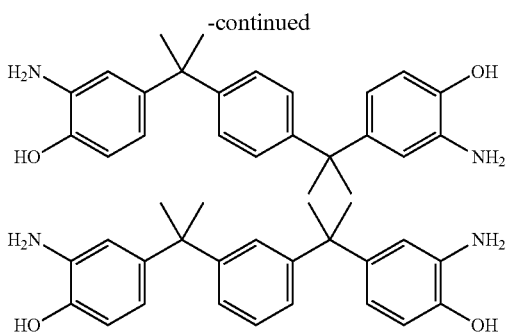

The tetracarboxylic dianhydrides used in the present invention to prepare the polyimide or polyamic acid compound (I) are not especially limited. They include aliphatic tetracarboxylic dianhydrides, cycloaliphatic/alicyclic tetracarboxylic dianhydrides or araliphatic/aromatic tetracarboxylic dianhydrides. The cycloaliphatic/alicyclic tetracarboxylic dianhydrides are preferred. Many of the tetracarboxylic dianhydrides are known to the specialists in the field of liquid crystal alignment materials and are used as monomers or comonomers to prepare liquid crystal alignment films for the rubbing method or the photoalignment technique. They can be used alone or in a combination of two or more. They are represented by the following general Formula 6

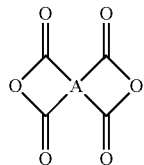

(Formula 6)

Examples of aliphatic or cycloaliphatic/alicyclic tetracarboxylic dianhydrides useful in the present invention include (not limited):
2,3,5-tricarboxy-cyclopentylacetic-1,2:3,4-dianhydride (all isomers)
1,2,3,4-cyclobutanetetracarboxylic dianhydride;
1,3-dimethy-1,2,3,4-cyclobutanetetracarboxylic dianhydride;
1,3-dimethyl-1,3-dimethyl-1,2,3,4-cyclobutanetetracarboxylic dianhydride;
1,2,3,4-tetramethyl-1,2,3,4-cyclobutanetetracarboxylic dianhydride;
1,2,3,4-cyclopentanetetracarboxylic dianhydride;
2,3,5-tricarboxycyclopentylacetic dianhydride;
3,5,6-tricarboxynorbornane-2-acetic dianhydride;
2,3,4,5-tetrahydrofuranetetracarboxylic dianhydride;
5-(2,5-dioxotetrahydro-3-furanyl)-3a,4,5,9b-tetrahydronaphtho[1,2-c]furan-1,3-dione;
5-(2,5-dioxotetrahydro-3-furanyl)-5-methyl-3a,4,5,9b-tetrahydronaphtho[1,2-c]furan-1,3-dione;
5-(2,5-dioxotetrahydro-3-furanyl)-5-ethyl-3a,4,5,9b-tetrahydronaphtho[1,2-c]furan-1,3-dione;
5-(2,5-dioxotetrahydro-3-furanyl)-7-methyl-3a,4,5,7a-tetrahydro-2-benzofuran-1,3-dione;
5-(2,5-dioxotetrahydro-3-furanyl)-7-ethyl-3a,4,5,7a-tetrahydro-2-benzofuran-1,3-dione;
5-(2,5-dioxotetrahydro-3-furanyl)-6-methylhexahydro-2-benzofuran-1,3-dione,
6-(2,5-dioxotetrahydro-3-furanyl)-4-methylhexahydro-2-benzofuran-1,3-dione,
5-(2,5-dioxotetrahydrofural)-3-methyl-3-cyclohexene-1,2-dicarboxylic dianhydride;
bicyclo[2.2.2]oct-7en-2,3,5,6-tetracarboxylic dianhydride;
bicyclo[2.2.2]octane-2,3,5,6-tetracarboxylic acid dianhydride;
1,8-dimethylbicyclo[2.2.2]oct-7-ene-2,3,5,6-tetracarboxylic acid dianhydride;
tetrahydro-4,8-methanofuro[3,4-d]oxepine-1,3,5,7-tetrone;
3-(carboxymethyl)-1,2,4-cyclopentanetricarboxylic acid 1,4:2,3-dianhydride;
hexahydrofuro[3',4':4,5]cyclopenta[1,2-c]pyran-1,3,4,6-tetrone;
rel-[1S,5R,6R]-3-oxabicyclo[3.2.1]octane-2,4-dione-6-spiro-3'-(tetrahydrofuran2',5'-dione);
4-(2,5-dioxotetrahydrofuran-3-yl)tetrahydronaphthalene-1,2-dicarboxylicacid dianhydride,
5-(2,5-dioxotetrahydro-furan-3-yl)-3-methyl-3-cyclohexene-1,2-dicarboxylic-acid dianhydride,
4-tert-butyl-6-(2,5-dioxotetrahydro-3-furanyl)-2-benzofuran-1,3-dione;
9-isopropyloctahydro-4,8-ethenofuro[3',4':3,4]cyclobuta[1,2-t][2]benzofuran-1,3,5,7-tetrone;
1,2,5,6-cyclooctanetetracarboxylic acid dianhydride;
octahydro-4,8-ethenofuro[3',4':3,4]cyclobuta[1,2-f][2]benzofuran-1,3,5,7-tetrone;
octahydrofuro[3',4':3,4]cyclobuta[1,2-f][2]benzofuran-1,3,5,7-tetrone; tetrahydro-3,3'-bifuran-2,2',5,5'-tetrone;
Examples of araliphatic and aromatic tetracarboxylic dianhydrides useful in the present invention include (not limited):
pyromellitic acid dianhydride;
3,3',4,4'-benzophenonetetracarboxylic acid dianhydride;
4,4'-oxydiphthalic acid dianhydride;
3,3',4,4'-diphenylsulfonetetracarboxylic acid dianhydride;
1,4,5,8-naphthalenetetracarboxylic acid dianhydride;
2,3,6,7-naphthalenetetracarboxylic acid dianhydride;
3,3',4,4'-dimethyldiphenylsilanetetracarboxylic acid dianhydride;
3,3',4,4'-tetraphenylsilanetetracarboxylic acid dianhydride;
1,2,3,4-furantetracarboxylic acid dianhydride;
4,4'-bis(3,4-dicarboxyphenoxy)diphenyl sulfide dianhydride;
4,4'-bis(3,4-dicarboxyphenoxy)diphenyl sulfone dianhydride;
4,4'-bis(3,4-dicarboxyphenoxy)diphenylpropane dianhydride;
3,3',4,4'-biphenyltetracarboxylic acid dianhydride;
ethylene glycol bis(trimellitic acid) dianhydride;
4,4'-(1,4-phenylene)bis(phthalic acid) dianhydride;
4,4'-(1,3-phenylene)bis(phthalic acid) dianhydride;
4,4'-(hexafluoroisopropylidene)diphthalic acid dianhydride;
4,4'-oxydi(1,4-phenylene)bis(phthalic acid) dianhydride;
4,4'-methylenedi(1,4-phenylene)bis(phthalic acid) dianhydride;
4-tert-butyl-6-(2,5-dioxotetrahydro-3-furanyl)-2-benzofuran-1,3-dione.
Especially preferred examples of tetracarboxylic dianhydrides useful in the present invention include:
1,2,3,4-cyclobutanetetracarboxylic acid dianhydride;
1,2,3,4-cyclopentanetetracarboxylic acid dianhydride;
2,3,5-tricarboxycyclopentylacetic acid dianhydride;

tetrahydro-4,8-methanofuro[3,4-d]oxepine-1,3,5,7-tetrone;

3-(carboxymethyl)-1,2,4-cyclopentanetricarboxylic acid 1,4:2,3-dianhydride;

hexahydrofuro[3',4':4,5]cyclopenta[1,2-c]pyran-1,3,4,6-tetrone;

5-(2,5-dioxotetrahydrofuran-3-yl)-3-methyl-3-cyclohexene-1,2-dicarboxylic acid dianhydride;

pyromellitic acid dianhydride;

4-(2,5-dioxotetrahydrofuran-3-yl)tetrahydronaphthalene-1,2-dicarboxylic acid dianhydride;

5-(2,5-dioxotetrahydro-3-furanyl)-5-methyl-3a,4,5,9b-tetrahydronaphtho[1,2-c]furan-1,3-dione;

5-(2,5-dioxotetrahydro-3-furanyl)-3a,4,5,9b-tetrahydronaphtho[1,2-c]furan-1,3-dione;

5-(2,5-dioxotetrahydro-3-furanyl)-7-methyl-3a,4,5,7a-tetrahydro-2-benzofuran-1,3-dione;

4-tert-butyl-6-(2,5-dioxotetrahydro-3-furanyl)-2-benzofuran-1,3-dione;

4,4'-(hexafluorneoisopropylidene)diphthalic acid dianhydride and bicyclo[2.2.2]oct-7-ene-2,3,5,6-tetracarboxylic acid dianhydride.

The polyimide and for polyamic acid compounds (I) may be prepared by methods known to the specialists in the field of liquid crystal alignment materials. These compounds are preferably synthesized by reacting at least one tetracarboxylic dianhydride

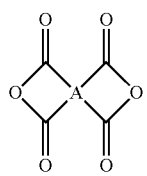

(Formula 6)

with at least one diamine NH$_2$-M-NH$_2$ carrying phenolic-OH groups and optionally one or several diamines NH$_2$—B—NH$_2$ without phenolic-OH groups in an organic solvent or solvent mixture. The amount of the diamine NH$_2$-M-NH$_2$ carrying phenolic OH-groups in compound (I) is at least 5% by weight relative to the total weight of compound (I). Therefore at least 5% by weight of diamine NH$_2$-M-NH$_2$ relative to the sum of amounts of dianhydride and all diamines are to be used in the synthesis of compound (I).

The proportion of anhydride functional groups relative to amine functional groups used in the synthesis can be chosen at will, but will to a certain extent determine the average molecular weight of the resulting polymer compound (I), as for instance expressed by its intrinsic viscosity [η]. Preferably the ratio of anhydride molecular equivalents relative to amine molecular equivalents will be in the range of 0.75 to 1.25.

The type of organic solvent or solvent mixture may be the same as or different from the solvent used in the preparation of the photoalignment composition of the present invention. It is not particularly limited as long as the primarily formed polyamic acid is dissolved. Preferred are aprotic polar solvents having a high dielectric constant and high polarity but lacking acidic hydrogen atoms, such as N-methyl pyrrolidone, N-ethyl pyrrolidone, N,N-dimethylacetamide, N,N-dimethylformamide, dimethylsulfoxide, tetramethylurea, hexamethylphosphoric acid triamide or gamma-butyrolactone. Especially preferred are N-methyl pyrrolidone, N-ethyl pyrrolidone, N,N-dimethylacetamide or mixtures of N-methyl pyrrolidone and/or N-ethyl pyrrolidone with gamma-butyrolactone.

The amount of solvent or solvent mixture is not particularly limited. Preferably it is chosen within the range of about 99% by weight to 60% by weight, with respect to the total amount of reaction mixture (solvents+dianhydrides+diamines). It is convenient to choose the amount of solvent to allow for easy handling of the polyamic acid solution and also perform the subsequent preparation of the photoalignment composition of the present invention without having to adjust the polymer concentration by e.g. additional evaporation of solvents prior to mixing with the other components.

The polymer synthesis is conducted at a temperature of −20° C. to about 100° C., more preferably at −10° C. to 80° C., with the reaction time being preferably in the range of 30 minutes to 48 hours.

The initially formed reaction product is mainly in the form of a polyamic acid, derived from the ring opening addition of the amine groups to the cyclic anhydride groups. It may be used as it is to directly prepare the photoalignment composition of the present invention, or the polyamic acid compound (I) can be isolated in solid form by precipitation of the polymer solution into a non-solvent such as water or methanol, followed by drying the collected solid polymer under reduced pressure. The procedure of dissolving the polyamic acid in a solvent and precipitating with a non-solvent can be repeated when a further purification is needed. When the alignment composition using the polyamic acid compound (I) as described above has been coated or printed onto a substrate to provide an alignment layer for the photoalignment of liquid crystals, a heat treatment step in the temperature range of 80° C. to 230° C. is usually necessary in order to convert most of the polyamic acid structures to polyimide structures.

Alternatively it is also possible to convert the initially formed polyamic acid solution to a polyimide solution, either partly or entirely, prior to the preparation of the inventive composition, by heating it to a temperature of 80° C. to 200° C. and/or by adding a dehydrating agent such as for example acetic anhydride or trifluoroacetic anhydride. The dehydrating cyclisation reaction may also be catalysed by tertiary amines such as triethylamine, N-ethyl diisopropylamine or pyridine. By using these cyclisation procedures it is possible that some of the imide rings are actually in the form of an isoimide structure.

The polyimide compound (I) prepared as described above may be used as it is to directly prepare the photoalignment composition of the present invention, or the polyimide compound (I) can be isolated in solid form by precipitation of the polymer solution into a non-solvent such as water or methanol, followed by drying the collected solid polymer under reduced pressure. The procedure of dissolving the polyimide in a solvent and precipitating with a non-solvent can be repeated when a further purification is needed.

In addition to adjust the proper average molecular weight of the polyimide and/or polyamic acid compound (I) via the ratio of anhydride molecular equivalents relative to amine molecular equivalents it may be advantageous to add a terminal chain modifier, also called chain stopper, during the polymer synthesis. If the compound (I) contains amine end groups due to a stoichiometric excess of diamine, a monofunctional anhydride may be used in addition to the dianhydride. If the compound (I) contains anhydride end groups due to a stoichiometric excess of dianhydride, a monofunctional amine may be used in addition to the diamine.

The amount of terminal chain modifier is preferably in the range of 10% by weight or less with respect to the total amount of dianhydride and diamine used in the synthesis.

Examples of terminal chain modifiers are monofunctional anhydrides, such as succinic anhydride, maleic anhydride, phthalic anhydride, n-decyl succinic anhydride, n-dodecyl succinic anhydride, n-tetradecyl succinic anhydride and n-hexadecyl succinic anhydride. Other terminal modifiers are monoamines, such as aniline, n-butylamine, cyclohexylamine, n-pentylamine, n-hexylamine, n-heptylamine, n-octylamine, n-nonylamine, n-decylamine, n-undecylamine and n-dodecylamine.

The polyimide and/or polyamic acid compounds (I) may be either of a homopolymeric or copolymeric nature.

They are called homopolymers if only one molecular type of dianhydride and one molecular type of diamine are used in the preparation. If more than one molecular type of dianhydride and diamine are used they are called copolymers. Preferably compound (I) is a copolymer and comprises one molecular type of dianhydride and two molecular types of diamines, one being of the type $NH_2$—B—$NH_2$ without additional phenolic OH-groups and one being $NH_2$-M-$NH_2$ containing phenolic-OH groups, under the proviso that the amount of diamine $NH_2$-M-$NH_2$ is 10% by weight relative to the total amount of diamines $NH_2$—B—$NH_2$ and $NH_2$-M-$NH_2$. More preferred are homopolymeric compounds (I) comprising one molecular type of dianhydride and one diamine $NH_2$-M-$NH_2$ containing phenolic OH-groups.

Especially preferred are copolymeric compounds (I) in the form of block copolymers comprising recurring block units:

... [Block B]$_b$ ... [Block C]$_c$ ...

Where Block B comprises prepolymerized recurring structural units from at least one molecular type of dianhydride

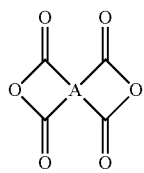

and at least one molecular type of diamine $NH_2$—B—$NH_2$ without phenolic OH-groups according to Formula 3

(Formula 3)

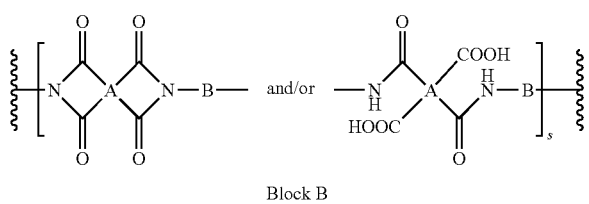

Block B and Block C comprises prepolymerized recurring structural units from at least one molecular type of dianhydride

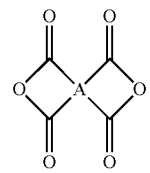

and at least one molecular type of diamine $NH_2$-M-$NH_2$ with phenolic OH-groups according to Formula 4

(Formula 4)

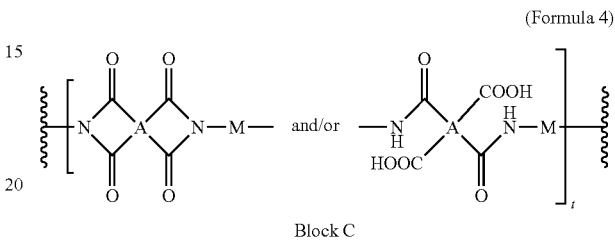

Block C

Where b and c are integers indicating the number of recurring block units in the polymer chain and s and t are integers indicating the number of recurring structural units in block B and block C, such that b*s+c*t is a value of 10 to 1000, under the proviso that at least 10% by weight of the recurring units of the Block C are present in 100% by weight of compound (I).

The block copolymers ... [Block B]$_b$ ... [Block C]$_c$ ... can be prepared by several methods known in the art. In one method (Method A) a first Block (e.g. Block B) is prepolymerized by reacting a first dianhydride and a first diamine in a solvent or solvent mixture, using a stoichiometric molar excess of either dianhydride or diamine. In case of a dianhydride excess the first Block will contain anhydride end groups in the prepolymer chain. In case of a diamine excess the first Block will contain amine end groups in the prepolymer chain.

The second dianhydride and the second diamine of the second Block (e.g. Block C) are then added to the reaction solution of the prepolymerized first Block and reacted to provide the second Block, whereby the stoichiometric molar excess of the second dianhydride or the second diamine will be chosen according to the following:

i) if the first Block contains anhydride end groups due to an excess of first dianhydride, then the second diamine for the second Block will be used in a molar excess. This will lead to amine end groups in the second Block ii) if the first Block contains amine end groups due to an excess of first diamine, then the second dianhydride for the second Block will be used in a molar excess. This will lead to anhydride end groups in the second Block.

When the second Block with amine end groups is formed according to i) it will react at the same time with the first Block containing anhydride end groups to yield the compound (I) as a block copolymer.

When the second Block with anhydride end groups is formed according to ii) it will react at the same time with the first Block containing amine end groups to yield the compound (I) as a block copolymer.

A terminal chain modifier may be used in order to restrict the average molecular weight of the compound (I) in the same way as described above for the non-block polymers.

In another method (Method B) a first Block (e.g. Block B) is prepolymerized by reacting a first dianhydride and a first diamine in a solvent or solvent mixture, using a stoichiometric molar excess of either dianhydride or diamine. In case of a dianhydride excess the first Block will contain anhydride end groups in the prepolymer chain. In case of a diamine excess the first Block will contain amine end groups in the prepolymer chain. A second Block (e.g. Block C) is then separately prepared by reacting a second dianhydride with a second diamine in a solvent or solvent mixture, using a stoichiometric molar excess of either dianhydride or diamine. In case of a dianhydride excess the second Block will contain anhydride end groups in the prepolymer chain. In case of a diamine excess the second Block will contain amine end groups in the prepolymer chain. The first Block is then reacted with the second Block to yield the compound (I) in the form of a block polymer, under the proviso that iii) if the first Block contains anhydride end groups the second Block should contain amine end groups and iv) if the first Block contains amine end groups the second Block should contain anhydride end groups.

Both Methods A and B are equally useful for preparing the compound (I) as a block polymer, but Method A is preferred due to its simplicity and economical advantage.

Compound (II) of the present liquid crystal photoalignment composition is a photoactive compound comprising photoalignment groups. The amount of compound (II) is 0.5%-50% by weight of the sum of weights of compound (I) and compound (II), preferably 1% to 30% by weight and more preferably 2% to 20% by weight. At least one compound (II) has to be included in the composition of the present invention to impart the necessary photoalignment property. Many of the photoactive compounds (II) comprising photoalignment groups are known to the specialists in the field of liquid crystal alignment materials. They are used for the preparation of liquid crystal photoalignment films for the fabrication of optical and electrooptical devices. Such photoactive compounds for the photoalignment method and their application are for instance disclosed in the following publications: O. Yaroshuk, Y. Renikov, J. Mater. Chem., 2012, 22, 286-300 and references cited therein; U.S. Pat. Nos. 5,389,698; 5,838,407; 5,602,661; 6,160,597; 6,369,869; 6,717,644; 6,215,539; 6,300,991 and 6,608,661. In the context of the present invention "photoalignment groups" are photoactive functional groups which anisotropically absorb light radiation. They induce anisotropic molecular alignment of liquid crystals by irradiation with aligning light, which in most cases consists of polarized light radiation. When irradiated the photoalignment groups of this invention undergo photoreactions, such as photocrosslinking reactions, dimerization reactions, cis/trans isomerization reactions, rearrangement reactions and degradation reactions. Therefore the photoalignment groups of the present invention are functional groups which undergo the above reactions.

Generally photoactive compounds (II) comprising photoalignment groups of the present invention are monomers, oligomers, dendrimers, prepolymers and polymers including copolymers, where the photoalignment groups comprise photoactive functional groups such as alpha, beta-unsaturated nitrile groups; alpha, beta-unsaturated carbonyl groups, where the carbonyl group can also be part of an ester-, amide, imide, hydrazine or thioester functional group, including cinnamates and chalcones;

coumarines and quinolones;

stilbenes;

azo groups;

chromones and chromenes;

mono- and di-acetylene groups;

en-ine groups or photodegradable polymers, where these functional groups can be unsubstituted or comprise substituents such as:

halogen (fluorine, chlorine, bromine); cyano; $C_1$-$C_4$-alkoxy; carboxylic acid; ester groups with linear or branched $C_1$-$C_{12}$ alkyl, optionally substituted with fluorine or cyano groups; linear or branched alkyl and cycloalkyl groups with 1-12 C atoms, optionally substituted with fluorine or cyano groups; aromatic groups with 6-18 C atoms optionally substituted with the aforementioned groups.

Preferred photoactive compounds (II) comprising photoalignment groups are polyimide and/or polyamic acid oligomers and polymers including copolymers, where the photoalignment groups comprise photoactive functional groups such as alpha, beta-unsaturated nitrile groups; alpha, beta-unsaturated carbonyl groups, where the carbonyl group can also be part of an ester-, amide or thioester functional group, including cinnamates and chalcones;

coumarines;

stilbenes and azo groups, where these photoactive functional groups can be unsubstituted or comprise substituents such as:

halogen (fluorine, chlorine, bromine); cyano; $C_1$-$C_4$-alkoxy; carboxylic acid; ester groups with linear or branched $C_1$-$C_{12}$ alkyl, optionally substituted with fluorine or cyano groups; linear or branched alkyl and cycloalkyl groups with 1-12 C atoms, optionally substituted with fluorine or cyano groups; aromatic groups with 6-18 C atoms optionally substituted with the aforementioned groups.

These preferred photoactive compounds (II) can be represented by the generic structural Formula 7:

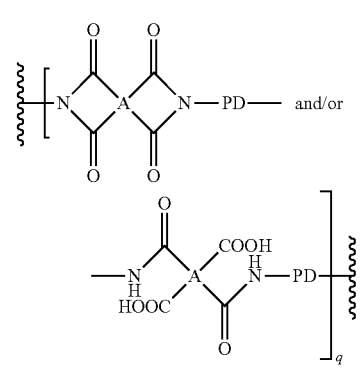

(Formula 7)

where A is a tetravalent organic residue of a tetracarboxylic dianhydride and has the same meaning as explained for compound (I), q is an integer indicating the number of repeating structural units in the molecular chain with an average value from about 10 to about 200 and PD is the divalent residue of an aromatic diamine $NH_2$—PD-$NH_2$ comprising the above mentioned photoactive photoalignment groups in the molecular structure. Such photoalignment groups are represented in the following Formula 8. The stars at the ends of the generic molecules indicate the positions where the groups can be built into the residue PD in the diamine $NH_2$—PD-$NH_2$. X in structure (5) represents —O—, —S— or $NR^1$, wherein $R^1$ represents a hydrogen atom or a $C_1$-$C_6$-alkyl group.

The linkage for incorporation of these photoalignment groups can be effected via a single bond, via an ester group, a thioester group, an ether group, a carbonate group, an amide group or a sulfide group. Preferably the linkage is effected by using additional spacer groups together with the aforementioned linkage groups. The term "spacer group" as used in the context of the present invention is an unsubstituted or substituted aromatic, carbocyclic or heterocyclic group with 6-40 C-atoms or preferably is a cyclic, linear or branched, substituted or unsubstituted $C_1$-$C_{24}$-alkylene group, where one or more non-adjacent —$CH_2$— groups may independently from each other be replaced by a group selected from —O—, —CO—, —CO—O—, —O—CO—, —$NR^1$—, —$NR^1$—CO—, —CO—$NR^1$—, —$NR^1$—CO—O—, —O—CO—$NR^1$—, —$NR^1$—CO—$NR^1$—, —CH=CH—, —C≡C—, —O—CO—O—, and —Si$(CH_3)_2$—O—Si$(CH_3)_2$—, wherein $R^1$ represents a hydrogen atom or a $C_1$-$C_6$— alkyl group.

One, two or three photoalignment groups can be linked to the diamine $NH_2$—PD-$NH_2$.

(Formula 8)

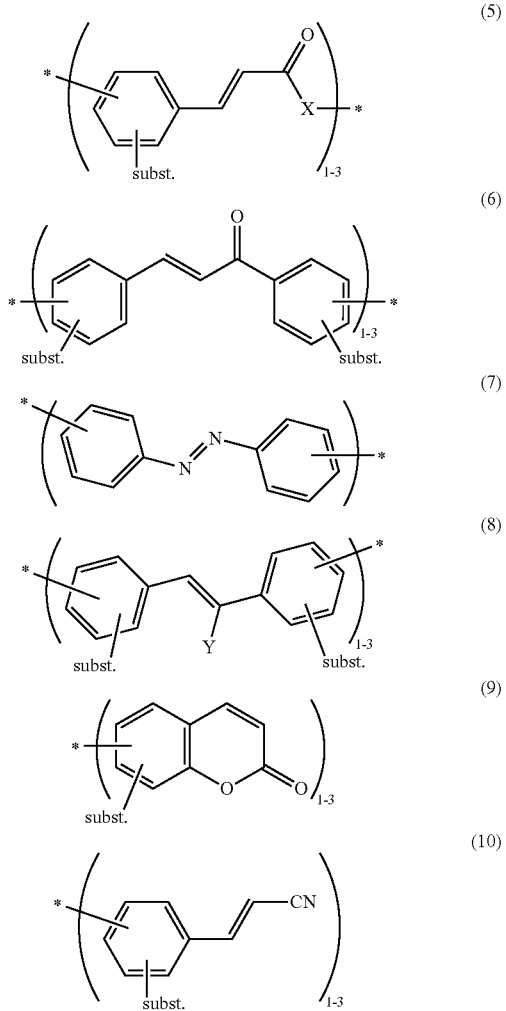

Structure (5) represents a cinnamate group as an example of an alpha, beta-unsaturated carbonyl group, where X includes —O—; —$NR^1$— with $R^1$ being H or $C_1$-$C_4$-alkyl or —S— and subst. stands for substituents such as halogen (fluorine, chlorine, bromine); cyano; $C_1$-$C_4$-alkoxy; carboxylic acid; ester groups with linear or branched $C_1$-$C_{12}$ alkyl, optionally substituted with fluorine or cyano groups; linear or branched alkyl and cycloalkyl groups with 1-12 C atoms, optionally substituted with fluorine or cyano groups; aromatic groups with 6-18 C atoms optionally substituted with the aforementioned groups. Up to 3 such substituents can be comprised in the aromatic moiety of structure (5) and the diamine $NH_2$—PD-$NH_2$ can carry the structure 5 once or twice.

Structure (6) represents a chalcone group and subst. stands for the same as described for structure (5).

Structure (7) represents an azo group.

Structure (8) represents a stilbene group, where Y is either H, nitrile (CN) or other electron withdrawing group, and subst. stands for the same as described for structure (5).

Structure (9) represents a coumarine group.

Structure (10) represents an alpha, beta-unsaturated nitrile group.

Especially preferred photoactive compounds (II) comprising photoalignment groups are polyimide and/or polyamic acid polymers and copolymers according to Formula and Formula 8, where the photoalignment groups are chosen from the groups of cinnamates (5), coumarines (9) and stilbenes (8). where these functional groups can be unsubstituted or comprise substituents such as halogen (fluorine, chlorine, bromine); cyano; $C_1$-$C_4$-alkoxy; carboxylic acid; ester groups with linear or branched $C_1$-$C_{12}$ alkyl, optionally substituted with fluorine or cyano groups; linear or branched alkyl and cycloalkyl groups with 1-12 C atoms, optionally substituted with fluorine or cyano groups; aromatic groups with 6-18 C atoms optionally substituted with the aforementioned groups.

Non limiting examples of diamines $NH_2$—PD-$NH_2$ used to prepare these especially preferred photoactive compounds (II) are for instance disclosed in the U.S. Pat. No. 8,173,749 B2 on column 4, line 17 up to column 31, line 7, which document is herewith incorporated as reference.

The preferred photoactive compounds (II) from the class of polyimide and/or polyamic acid oligomers and polymers including copolymers may be prepared by methods known to the specialists in the field of liquid crystal alignment materials. They are preferably synthesized by reacting at least one tetracarboxylic dianhydride

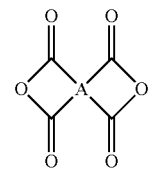

with at least one diamine $NH_2$—PD-$NH_2$ comprising photoalignment groups in the molecular structure in an organic solvent or solvent mixture.

The proportion of anhydride functional groups relative to amine functional groups used in the synthesis can be chosen at will, but will to a certain extent determine the average molecular weight of the resulting polymer compound (II), as for instance expressed by its intrinsic viscosity [η]. Preferably the ratio of anhydride molecular equivalents relative to amine molecular equivalents will be in the range of 0.75 to 1.25.

The type of organic solvent or solvent mixture is not particularly limited as long as the primarily formed polyamic acid (II) is dissolved. Preferred are aprotic polar solvents having a high dielectric constant and high polarity but lacking acidic hydrogen atoms, such as N-methyl pyrrolidone or N-ethyl pyrrolidone and gamma-butyrolactone. Especially preferred are N-methyl pyrrolidone and N-ethyl pyrrolidone or mixtures of N-methyl pyrrolidone and/or N-ethyl pyrrolidone with gamma-butyrolactone.

The amount of solvent or solvent mixture is not particularly limited. Preferably it is chosen within the range of about 99.9% by weight to 60% by weight, with respect to the total amount of reaction mixture (solvents+dianhydride+diamine). It is convenient to choose the solvent amount in order to allow easy handling of the polyamic acid solution and also perform the subsequent preparation of the photoalignment composition of the present invention without having to adjust the polymer concentration by e.g. additional evaporation of solvents prior to mixing with the other components.

The polymer synthesis is conducted at a temperature of −20° C. to about 100° C., more preferably at −10° C. to 80° C., with the reaction time being preferably in the range of 30 minutes to 48 hours.

The initially formed reaction product is mainly in the form of a polyamic acid (II), derived from the ring opening addition of the amine groups to the cyclic anhydride groups. It may be used as it is to directly prepare the photoalignment composition of the present invention, or the polyamic acid compound (II) can be isolated in solid form by precipitation of the polymer solution into a non-solvent such as water or methanol, followed by drying the collected solid polymer under reduced pressure. The procedure of dissolving the polyamic acid (II) in a solvent and precipitating with a non-solvent can be repeated when a further purification is needed. When the alignment composition using the polyimide and/or polyamic acid compound (I) and the photoactive compound (II) comprising photoalignment groups according to the present invention has been coated or printed onto a substrate to provide an alignment layer for the photoalignment of liquid crystals, a heat treatment step in the temperature range of 80° C. to 230° C. is usually applied in order to convert most of the polyamic acid structures to polyimide structures.

Alternatively it is also possible to convert the initially formed polyamic acid solution of the photoactive compound (II) to a polyimide solution, either partly or entirely, prior to the preparation of the inventive composition, by heating it to a temperature of 80° C. to 200° C. and/or by adding a dehydrating agent such as acetic anhydride or trifluoroacetic anhydride. The dehydrating cyclisation reaction may also be catalysed by tertiary amines such as triethylamine, N-ethyl diisopropylamine or pyridine. By using these cyclisation procedures it is possible that some of the imide rings are actually in the form of an isoimide structure. The polyimide compound (II) prepared as described above may be used in the form of its polymer solution to directly prepare the photoalignment composition of the present invention, or the polyimide compound (II) can be isolated in solid form by precipitation of the polymer solution into a non-solvent such as water or methanol, followed by drying the collected solid polymer under reduced pressure. The procedure of dissolving the polyimide (II) in a solvent and precipitating with a non-solvent can be repeated when a further purification is needed. In addition to adjust the proper average molecular weight of the polyimide and/or polyamic acid compound (II) via the ratio of anhydride molecular equivalents relative to amine molecular equivalents it may be advantageous to add a terminal chain modifier, also called chain stopper, during the polymer synthesis. If the photoactice compound (II) contains amine end groups due to a stoichiometric excess of diamine a monofunctional anhydride may be used in addition to the dianhydride. If the photoactive compound (II) contains anhydride end groups due to a stoichiometric excess of dianhydride a monofunctional amine may be used in addition to the diamine.

The amount of terminal chain modifier is preferably in the range of 10% or less with respect to the total amount of dianhydride and diamine used in the synthesis.

Examples of terminal chain modifiers are monofunctional anhydrides, such as succinic anhydride, maleic anhydride, phthalic anhydride, n-decyl succinic anhydride, n-dodecyl succinic anhydride, n-tetradecyl succinic anhydride and n-hexadecyl succinic anhydride. Other terminal modifiers are monoamines, such as aniline, n-butylamine, cyclohexylamine, n-pentylamine, n-hexylamine, n-heptylamine, n-octylamine, n-nonylamine, n-decylamine, n-undecylamine and n-dodecylamine.

The sum of weights of compound (I) and compound (II) relative to the total weight of the composition of the present invention is 0.5% to 30% by weight, preferably 1% to 20% by weight and more preferably 2% to 10% by weight.

Preferably, the composition according to the present invention is in the form of a clear solution. The solvent or solvent mixture used in the present application may be of any kind as long as it can dissolve the composition and is providing essential properties such as good handling performance, good storage stability, adequate viscosity and good coatability or printability of the solution onto the substrate material.

Non limiting examples of solvents or solvent mixtures (referred to as c) in the composition) for the composition of the present invention comprise solvents from the groups of (i) aprotic polar solvents such as N-methyl pyrrolidone; N-ethyl pyrrolidone; N-vinyl pyrrolidone; N,N-dimethyl formamide; N,N-dimethyl acetamide; 1,3-dimethyl-2-innidazolidinone; dimethylsulfoxyde.

(ii) ester solvents such as methyl acetate; ethyl acetate; n-propyl acetate; isopropyle acetate; n-butyl acetate; isobutyl acetate; n-amyl acetate; isoamyl acetate; isopropyl propionate; n-butyl propionate; n-pentyl propionate; isobutylpropionate; isobutylisobutyrate; 2-ethylhexylacetate; propylene glycol monomethyl ether acetate; propylene glycol monoethyl ether acetate; propylene glycol monobutyl ether acetate; 1-methoxypropylacetate; 2-hydroxy ethyl acetate; 2-hydroxy ethyl propionate; 2-hydroxy-2-methyl ethyl propionate; cyclohexanol acetate; propylenglycol diacetate; dipropylenglycol methyl ether acetate; 1,4-butanediol diacetate; 1,6-hexanediol diacetate; butyl cellosolve acetate; ethyl lactate; n-propyl lactate; isopropyl lactate; methyl 3-methoxypropionate; methyl 3-ethoxypropionate; ethyl 3-methoxypropionate; ethyl 3-ethoxypropionate.

(iii) lactones such as gamma-butyrolactone; caprolactone.

(iv) ketones such as acetone; methyl ethyl ketone; methyl propyl ketone; methyl isobutyl ketone; 2-heptanone; 3-heptanone; 4-heptanone; methyl isoamyl ketone (2-methyl-5-hexanone); diisobutyl ketone; 5-methyl-3-heptanone; 2-octanone; isophorone; mesityl oxide; cyclohexanone; 3,3,5-trimethylcyclohexanione; cyclopentanone.

(v) carbonates such as diethylcarbonate, dipropylcarbonate, methyl-propylcarbonate.

(vi) glycols and glycol ethers such as ethylene glycol mono ethyl ether; ethylene glycol mono butyl ether; ethylene glycol mono hexyl ether; ethylene glycol mono isopropyl ether; ethylene glycol mono propyl ether; diethylene glycol mono ethyl ether; diethylene glycol mono butyl ether; diethylene glycol mono hexyl ether; diethylene glycol mono isopropyl ether; propylene glycol mono methyl ether; propylene glycol mono ethyl ether; propylene glycol mono propyl ether; propylene glycol mono butyl ether; dipropylene glycol mono methyl ether; dipropylene glycol mono butyl ether; ethylene glycol dimethyl ether; diethylene glycol dimethyl ether; diethylene glycol diethyl ether; propylene glycol dimethyl ether; dipropylene glycol dimethyl ether; dipropylen glycol methyl n-propyl ether.

(vii) ethers such as anisole; tetrahydrofurane; 2-methyl tetrahydrofurane; dioxane; methyl tert butyl ether.

(viii) nitriles such as acetonitrile; isovaleronitrile; 2-methyl butyronitrile.

(ix) acetals such as ethylal (formaldehyde diethylacetal); propylal (formaldehyde di-n-propyl acetal); butylal (formaldehyde di-n-butyl acetal); 1,3-dioxolane; 2,5,7,10-tetraoxaundecane.

(x) alcohols such as isopropanol; isobutanol; butanol; pentanol; isopentanol; cyclohexanol; n-hexanol; methyl isobutyl-carbinol; 1-methoxypropanol; 2-ethyl-1-hexanol, 2-methyl-1-pentanol.

(xi) halogenated hydrocarbon solvents such as dichloromethane; 1,2-dichloroethane; 1,4-dichloro butane; trichloro ethane; chlorobenzene; o-dichlorobenzene; α,α,α-trifluorotoluene.

(xii) hydrocarbons such as hexane; heptane; octane; nonane; decane; undecane; benzene; toluene; xylene.

The type and the percentage of solvents or solvent mixtures in the composition of the present invention mainly depends on the coating or printing methods used to prepare the liquid crystal alignment film or coating layer for the fabrication of optical and electrooptical elements and devices.

Known methods for printing or coating the present composition include spin coating, roll coating and printing methods such as flexographic, offset, gravure and inkjet printing. Of these inkjet printing has recently gained high popularity, especially for preparing larger devices such as e.g. TV displays. Each of the various methods needs a proper balance of the types and concentrations of the solvent components in the formulation in order to provide excellent coating results such as regular coating thickness, good spreadability and absence of coating defects. As the composition is not restricted to a specific coating or printing method no precise choice of solvents can be given.

Nevertheless the present inventors have found that preferably the composition comprise a aprotic polar solvent, having a high dielectric constant and high polarity but lacking acidic hydrogen atoms, such as N-methyl pyrrolidone or N-ethyl pyrrolidone and gamma-butyrolactone. It is preferable that together these two solvents enter the composition in more than 30% by weight.

In addition, in order to improve the handling property, the coating quality or to adjust viscosity, the formulation may further include a polar protic or aprotic poor solvent or an apolar poor solvent. Examples of polar protic or aprotic poor solvents include, without limitation, groups such as acetals, alcohols, monoalkylated or dialkylated glycols, carboxylic acid esters preferably highly branched, alkoxy aliphatic-carboxylic acid ester, lactate, ketones preferably highly branched, ethers, carbonates, nitrile as long as the dissolved polyamic acid and/or polyimide is not precipitated. Examples of apolar poor solvent include without limitation groups such as hydrocarbons and halogenated hydrocarbon solvents, as long as the dissolved polyamic acids and/or polyimides (I) and (II) are not precipitated. Especially preferred polar protic or aprotic poor solvents include monoalkylated or dialkylated glycol ethers and alkoxy aliphatic carboxylic acid esters such as e.g. ethyl 3-ethoxy propionate. The weight of solvent or solvent mixture c) relative to the total weight of the composition of the present invention is 99.5% to 70% by weight, preferably 99% to 80% by weight and more preferably 98% to 90% by weight.

Further the composition of the present invention may optionally comprise one or several additives. They are generally used in minor amounts to improve certain performance criteria of the present composition, such as for instance coating and printing behaviour, storage stability and inhibition of colour formation as well as for instance improving the mechanical and thermal properties and the photoalignment properties of the alignment layer produced from the present composition. They are commonly classified in groups such as antioxidants, inhibitors, stabilizers, surface active agents, flow improvers, defoaming agents, sensitizers, adhesion promoters, thixotropic agents, pigments, initiators and others. Non-limiting examples are hydroquinone, 2,6-di-tert.-butyl-4-methylphenol (BHT), 4-ethoxyphenol, 4-methoxyphenol, phenothiazine, and N-phenyl-2-naphthylamine. The amount of additives in the composition is generally less than 20% relative to the total weight of the composition, preferably less than 10% and more preferably less than 5%.

The present invention relates to a photo-alignment composition for the alignment of liquid crystals, comprising, inter alia, non-photopolymer compounds (I) from the class of polyimide and/or polyamic acid compounds, comprising repeating structural units from diamines carrying phenolic OH-groups. When these compounds (I) are used in the above alignment compositions they provide excellent electrical performance, such as excellent voltage holding ratio, and good liquid crystal alignment characteristics without effecting the electro-optical performance of the photopolymer compound (II) in the above composition.

EXAMPLES

Definitions

BC=Butyl cellosolve (2-butoxy ethanol)
Butylal=Formaldehyde di-n-butylacetal
DEE=Diethylene glycol diethylether
DMSO=Dimethylsulfoxide
EEP=Ethyl 3-ethoxypropionate
GBL=gamma-Butyrolactone
MIAK=Methyl isoamyl ketone (2-Methyl-5-hexanone)
MLC-6610 (Merck KGA)=Licristal® MLC-6610 (Merck KGA), nematic liquid crystal
NMP=N-methyl-pyrrolidone
o.th.=of theory
Pd/C=Palladium on carbon (catalyst)
THF=Tetrahydrofurane Availability of Materials and Components The polyimide or polyamic acid compounds (I) are prepared from dianhydrides and diamines $NH_2$—B—$NH_2$ and $NH_2$-M-$NH_2$, as described in Polymer Examples.

The dianhydrides (A-dianhydride) are commercial materials or can be prepared by known methods.

The diamines $NH_2$—B—$NH_2$ without additional phenolic OH-groups are generally available from commercial sources.

The diamines $NH_2$-M-$NH_2$ with additional phenolic OH-groups are either commercially available or can be synthesized by known methods, e.g. by nitration of the corresponding bisphenols with nitric acid, followed by reduction of the dinitrocompounds using e.g. hydrazine hydrate and a catalyst such as Pd/C (Examples 1-3 below).

Non-limiting examples of the preparation of the photoactive compounds (II) with photoalignment groups is given in Photopolymer examples PP1 to PP7. Other photoactive compounds (II) are either commercially available or can be prepared according to the state of the art.

Preparation of Diaminophenol Compounds

Example 1: Preparation of 2-amino-4-[1-[3-[1-(3-amino-4-hydroxy-phenyl)-1-methyl-ethyl]phenyl]-1-methyl-ethyl]phenol

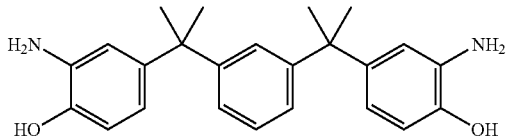 [SMILES: CC(C)(c1cccc(C(C)(C)c2ccc(O)c(N)c2)c1)c1ccc(O)c(N)c1]

Nitration: A 350 ml 4-neck reactor is charged with 17.30 g (0.050 Mole) 4,4'-(1,3-phenylenediisopropylidene)bisphenol (Bisphenol M) [13595-25-0] and 130 ml of dichloromethane. The suspension is stirred and cooled to 0° C. with an ice-bath and 11.30 g of an aqueous 65%-nitric acid solution are slowly (dropwise) added over 1 hour, keeping the temperature between 0° C.-5° C. The brownish reaction mixture is stirred and kept at this temperature for additional 4 hours.

120 ml of water are added and the mixture stirred vigorously to extract the excess of nitric acid into the aqueous phase. The water phase is separated and the organic dichloromethane phase extracted once with 150 ml of an aqueous 10%-solution of sodium hydrogen carbonate, followed by 150 ml pure water. The dichloromethane phase is dried with little sodium sulphate, filtered and the filtrate concentrated on a rotary evaporator to yield 43 g of a yellow-brown oil. Crystallization is effected by adding isopropyl alcohol (100 ml) and cooling with an ice bath. After several hours a brownish suspension has formed, which is filtered and the residue washed with cold isopropyl alcohol. The solid product is dried in vacuo at 40° C. to afford 15 g (68% o.th.) of yellow-brown, crystalline 2,2'-Dinitro-bisphenol M. HPLC purity (254 nm, area %): 88%.

Reduction: 14.00 g (0.0321 Mole) of 2,2'-Dinitro-bisphenol M are dissolved in 80 ml of N-methyl-pyrrolidone (NMP). 1.925 g of the catalyst Palladium on carbon E1002 U/W (from Degussa) are added, followed by 30 ml of methanol. The black suspension is heated to 45° C. 8 ml (0.168 Mole $NH_2NH_2$) of hydrazine monohydrate 98% (~65% $NH_2NH_2$) are drop wise added within 30 minutes. The temperature rapidly rises to the reflux temperature of methanol (76-80° C.), and the reaction is accompanied by the evolution of nitrogen gas. The black reaction mixture is refluxed for 2 hours with an oil bath of 90° C. After cooling to 40° C. internal temperature the catalyst is filtered off. The yellowish, clear filtrate is again heated to 90° C. and 180 ml of water are added. The product starts to crystallize. After cooling to 0° C. the crystals are filtered, washed with water and dried in vacuo at 50° C. to constant weight. 10.45 g (86.6% o.th.) slightly beige, crystalline 2-amino-4-[1-[3-[1-(3-amino-4-hydroxy-phenyl)-1-methyl-ethyl]phenyl]-1-methyl-ethyl]phenol are obtained, HPLC purity (230 nm, area %): 96%.

$^1$H-NMR 300 MHz, DMSO-d6, δ ppm:
8.72 (s, 2H), 7.17-6.24 (m, 10H), 4.35 (s, 4H), 1.49 (s, 12H)

Example 2: Preparation of 2-amino-4-[1-[4-[1-(3-amino-4-hydroxy-phenyl)-1-methyl-ethyl]phenyl]-1-methyl-ethyl]phenol

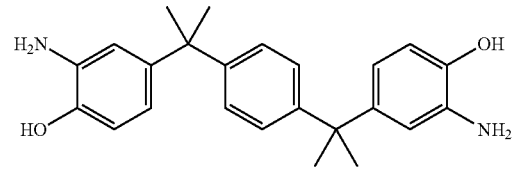 [SMILES: CC(C)(c1ccc(C(C)(C)c2ccc(O)c(N)c2)cc1)c1ccc(O)c(N)c1]

Nitration: 17.32 g (0.05 Mole) of 4-[1-[4-[1-(4-hydroxy-phenyl)-1-methyl-ethyl]phenyl]-1-methyl-ethyl]phenol (Bisphenol P) [2167-51-3] in 140 ml dichloromethane are treated with 11.30 g aqueous 65%-nitric acid solution according to the procedure described in example 1. 16.18 g (74% o.th.) of greenish-yellow, crystalline 4-[1-[4-[1-(4-hydroxy-3-nitro-phenyl)-1-methyl-ethyl]phenyl]-1-methyl-ethyl]-2-nitro-phenol are obtained. HPLC purity (254 nm, area %): 95.2%.

Reduction: 16.00 g (0.0366 Mole) of dinitro compound in 90 ml NMP and 35 ml methanol are treated with 2.20 g Palladium on carbon catalyst and 9.5 ml hydrazine monohydrate according to the procedure described in example 1. 13.24 g (96% o.th.) slightly beige, crystalline 2-amino-4-[1-[4-[1-(3-amino-4-hydroxy-phenyl)-1-methyl-ethyl]phenyl]-1-methyl-ethyl]phenol are obtained, HPLC purity (230 nm, area %): 97%.

$^1$H-NMR 300 MHz, DMSO-d6, δ ppm:
8.72 (s, 2H), 7.06 (s, 4H), 6.54-6.43 (m, 6H), 4.35 (s, 4H), 1.51 (s, 12H)

Example 3: Preparation of 2-amino-4-[1-(3-amino-4-hydroxy-phenyl)cyclohexyl]phenol

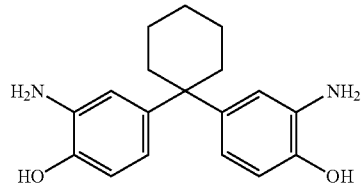 [SMILES: Nc1cc(C2(c3ccc(O)c(N)c3)CCCCC2)ccc1O]

Nitration: 18.78 g (0.07 Mole) of 4-[1-(4-hydroxyphenyl)cyclohexyl]phenol [843-55-0] in 140 ml dichloromethane are treated with 15.61 g aqueous 65%-nitric acid solution according to the procedure described in example 1. 15.84 g (63% o.th.) of yellow, crystalline 4-[1-(4-hydroxy-3-nitro-phenyl)cyclohexyl]-2-nitro-phenol are obtained. HPLC purity (254 nm, area %): 97.3%.

Reduction: 20.00 g (0.056 Mole) of dinitro compound in 110 ml NMP and 55 ml methanol, are treated with 3.35 g Palladium on carbon catalyst and 14 ml hydrazine monohydrate according to the procedure described in example 1. The crystalline raw product (20.54 g) was recrystallized from 100 ml of ethanol to yield 16.3 g (98% o.th.) of slightly beige product, HPLC purity (254 nm, area %): 98.8%.

¹H-NMR 300 MHz, DMSO-d6, δ ppm:

The NMR analysis revealed that the product forms a mixture with the solvent NMP 8.63 (s, 2H), 6.51-6.48 (m, 4H), 6.31-6.28 (m, 2H), 4.29 (s, 4H), 2.02 (s broad, 4H), 1.43 (s broad, 6H).

Preparation of Homopolymeric or Copolymeric Polyimide and Polyamic Acid Compounds (I)

List of Diamines Used or the Polymer Preparation

| Structure | Designation |
|---|---|
| 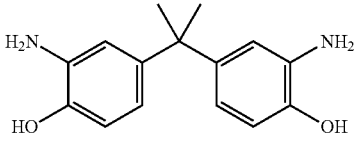<br>2,2-Bis(3-amino-4-hydroxyphenyl)propane | Diamine 1 |
| 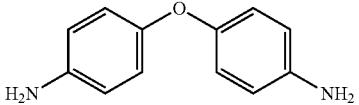<br>4,4'-oxydianiline | Diamine 2 |
| 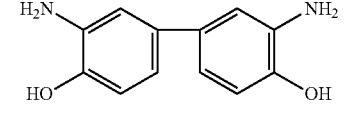<br>2-amino-4-(3-amino-4-hydroxy-phenyl)phenol | Diamine 3 |
| 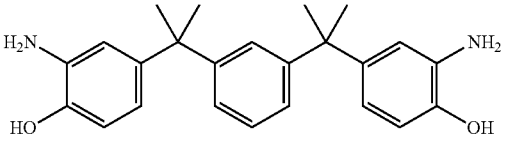<br>2-amino-4-[1-[3-[1-(3-amino-4-hydroxy-phenyl)-1-methyl-ethyl]phenyl]-1-methyl-ethyl]phenol | Diamine 4 (Preparation Example 1) |
| 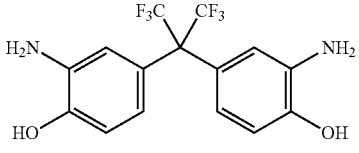<br>2-amino-4-[1-(3-amino-4-hydroxy-phenyl)-2,2,2-trifluoro-1-(trifluoromethyl)ethyl]phenol | Diamine 5 |
| 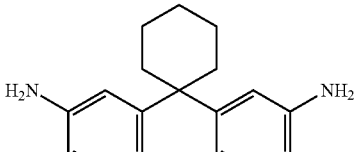<br>2-amino-4-[1-(3-amino-4-hydroxy-phenyl)cyclohexyl]phenol | Diamine 6 (Preparation Example 3) |
| <br>2-amino-4-(3-amino-4-hydroxy-phenyl)sulfonyl-phenol | Diamine 7 |

-continued

| Structure | Designation |
|---|---|
| HO-[phenyl]-OH with H₂N and NH₂ groups; 2-amino-5-(4-amino-3-hydroxy-phenyl)phenol | Diamine 8 |
| 2-amino-4-[1-[4-[1-(3-amino-4-hydroxy-phenyl)-1-methyl-ethyl]phenyl]-1-methyl-ethyl]phenol | Diamine 9 (Preparation Example 2) |
| 4-(4-amino-2-methyl-phenyl)-3-methyl-aniline | Diamine 10 |

List of Dianhydrides Used for the Polymer Preparation

| Structure | Designation |
|---|---|
| Cyclobutane-1,2,3,4-tetracarboxylic acid dianhydride | CBDA |
| 2,3,5-tricarboxy-cyclopentylacetic-1,2:3,4-dianhydride | TCA |

Polymer Example P1: Preparation of Polyamic Acid from Diamine 1 (2,2-Bis(3-amino-4-hydroxyphenyl)propane) and Dianhydride (CBDA)

A solution is prepared from 10.00 g (38 mMol) 2,2-Bis (3-amino-4-hydroxyphenyl)propane in 40.70 g NMP at room temperature. 7.59 g (38 mMol) CBDA are added and the reaction mixture is stirred for 24 hours at room temperature. Thereafter, the reaction mixture is diluted with 30 g of THF and is poured into an excessive amount of water to precipitate the polymer. The precipitated product is dried at 40° C. under vacuum for 24 hours to yield 16.5 g of polyamic acid (Designation PAA-1) as an off-white solid. Intrinsic viscosity [η]=0.40 dl/g.

$^1$H-NMR 300 MHz, DMSO-d6, δ ppm:

12.32 (s broad, approx. 2H), 9.55-9.49 (m, 4H), 7.65 (s, 2H), 6.74 (s, 4H), 3.98-3.28 (m, 4H), 1.52 (s, 6H)

Analogous to the procedure described in Polymer example P1 the following polymers are prepared from the diamines and dianhydrides indicated in the following table:

| Polymer example | Diamine | Dianhydride | Intrinsic viscosity [η] dl/g | $^1$H-NMR 300 MHz, DMSO-d6, δ ppm |
|---|---|---|---|---|
| P2 (comparative example, without phenolic OH), (PAA-2) | Diamine 2 | CBDA | 0.69 | 12.32 (s broad, 2H), 10.15 (s, 2H), 7.60-7.56 (m, 4H), 6.96-6.93 (m, 4H), 3.88-3.53 (m, 4H). |
| P3 (PAA-3) | Diamine 3 | CBDA | 0.45 | |
| P4 (PAA-4) | Diamine 4 | CBDA | 0.42 | |
| P5 (PAA-5) | Diamine 5 | CBDA | 0.48 | 12.7 (s broad, 2H), 10.30 (s, 2H), 9.52 (s, 2H), 8.22-8.17 (d, 2H), 6.90-6.81 (m, |

-continued

| Polymer example | Diamine | Dianhydride | Intrinsic viscosity [η] dl/g | ¹H-NMR 300 MHz, DMSO-d6, δ ppm |
|---|---|---|---|---|
| | | | | 4H), 3.99-3.50 (m, 4H). |
| P6 (PAA-6) | Diamine 1 + Diamine 2 1/1 (molar) | CBDA | 0.53 | |
| P7 (PAA-7) | Diamine 1 + Diamine 2 2/8 (molar) | CBDA | 0.50 | |
| P8 (PAA-8) | Diamine 6 | CBDA | 0.44 | 12.49 (s broad, 2H), 9.56 (s, 2H), 9.47 (s, 2H), 7.71 (s, 2H), 6.74-6.71 (m, 4H), 4.00-3.51 (m, 4H), 2.28-2.09 (m, 4H), 1.45 (s broad, 6H) |
| P9 (PAA-9) | Diamine 7 | CBDA | 0.34 | |
| P10 (PAA-10) | Diamine 8 | CBDA | 0.99 | |
| P11 (PAA-11) | Diamine 9 | CBDA | 0.54 | 12.48 (s broad, 2H), 9.51-9.58 (m, 4H), 7.70 (s, 2H), 7.08 (s, 4H), 6.74 (s, 4H), 3.99-3.45 (m, 4H), 1.55 (s, 12H) |
| P12 (PAA-12) | Diamine 1 | TCA | 0.49 | |
| P14 (PAA-14) | Diamine 10 | CBDA | 0.50 | |

Polymer Example P13: Preparation of Block Type Copolymeric Polyamic Acid from Diamine 1

(2,2-Bis(3-amino-4-hydroxyphenyl)propane) and CBDA (Block 1) and Diamine 2 (4,4'-oxydianiline) and CBDA (Block 2); ratio of Block 1:Block 2=54:46 (weight %).

1.8086 g 2,2-Bis(3-amino-4-hydroxyphenyl)propane are dissolved in 25.11 g N-methyl-pyrrolidone and cooled to 0° C. 1.569 g of CBDA are added and the mixture stirred for 2 hours at room temperature.

1.6022 g of 4,4'-oxydianiline are added and stirred until completely dissolved. 0.0754 g of succinic anhydride are added and the mixture cooled to 0° C. 1.226 g of CBDA are added and the mixture stirred at room temperature for 18 hours. Thereafter, the reaction mixture is diluted with 30 g of THF and is poured into an excessive amount of water to precipitate the polymer. The precipitated product is dried at 40° C. under vacuum for 24 hours to yield the polyamic acid (PAA-13) as an off-white solid. Intrinsic viscosity [η]=0.58 dl/g.

Polymer Example P15: Preparation of Block Type Copolymeric Polyamic Acid from Diamine 1

(2,2-Bis(3-amino-4-hydroxyphenyl)propane) and CBDA (Block 1) and Diamine 2 (4,4'-oxydianiline) and CBDA (Block 2); ratio of Block 1:Block 2=11:89 (weight %).

Analogous to the preparation of PAA-13 in Polymer Example P13, the polyamic acid PAA-15 is prepared by using 0.1295 g 2,2-Bis(3-amino-4-hydroxyphenyl)propane, 11.8821 g N-methyl-pyrrolidone, 0.1948 g CBDA and 1.4018 g 4,4'-oxydianiline, 0.0371 g succinic anhydride, 1.2014 g CBDA. After 18 hours at room temperature a clear, viscous solution is obtained with an intrinsic viscosity [η]=0.5016 dl/g. This solution can be directly used to prepare a composition according to the present invention.

Formation of Polyimide from Polyamic Acid

Polymer Example PI 1

1.45 g of polyamic acid from Polymer Example 4 is dissolved in 3.5 ml of NMP. Thereto are added 0.165 ml of pyridine and 0.195 ml of acetic anhydride. The dehydration and ring closure is carried out at 80° C. for 2 hours. The reaction mixture is diluted with 10 ml of NMP, precipitated by pouring into 100 ml diethyl ether and collected by filtration. The polymer is reprecipitated from 10 ml THF by pouring into 200 ml water and collected by filtration. The reprecipitated product is dried at room temperature under vacuum to yield 1.10 g of polyimide (PI-1) as an off-white solid. Intrinsic viscosity [η]=0.40 dL/g; Imidization degree 42%.

Polymer Example PI 2

Analogous to the preparation of Polymer Example 18, the polyamic acid of Polymer Example 5 is used to yield the corresponding polyimide (PI-2) as an off-white solid. Intrinsic viscosity [η]=0.65 dL/g.

Preparation of Photoactive Compounds (II) Comprising Photoalignment Groups

List of Diamines $NH_2$—PD-$NH_2$ Used or the Polymer Preparation

| Structure | Designation |
|---|---|
| 4-{(1E)-3-[2-(2,4-diaminophenyl)ethoxy]-3-oxoprop-1-enyl}phenyl 4-(4,4,4-trifluorobutoxy)benzoate<br>According to U.S. Pat. No. 8,173,749, analogue to Example 3 | PD1 |
| [4-[(E)-3-[[5-amino-2-[4-amino-2-[[(E)-3-[4-[4-(4,4,4-trifluorobutoxy)benzoyl]oxyphenyl]prop-2-enoyl]oxymethyl]phenyl]phenyl]methoxy]-3-oxo-prop-1-enyl]phenyl] 4-(4,4,4-trifluorobutoxy)benzoate<br>According to U.S. Pat. No. 8,173,749 Example 7 | PD2 |
| [4-[(E)-3-[2-(2,4-diaminophenyl)ethoxy]-3-oxo-prop-1-enyl]phenyl] 4-(4,4,5,5,5-pentafluoropentoxy)benzoate<br>According to U.S. Pat. No. 8,173,749 Example 4 | PD3 |
| [4-[(E)-3-[2-(2,4-diaminophenyl)-3-[(E)-3-[4-[4-(4,4,5,5,5-pentafluoropentoxy)benzoyl]oxyphenyl]prop-2-enoyl]oxy-propoxy]-3-oxo-prop-1-enyl]phenyl] 4-(4,4,5,5,5-pentafluoropentoxy)benzoate<br>According to U.S. Pat. No. 8,173,749, analogue to Example 8 | PD4 |

Photopolymer Example PP1: Preparation of Polyamic Acid from Diamine PD1 and Dianhydride TCA A solution is prepared from 2.117 g (3.66 mMol) diamine PD1 in 6.56 ml NMP at room temperature. The solution is cooled to 0° C. and 0.820 g (3.66 mMol) 2,3,5-tricarboxy-cyclopentylacetic-1,2:3,4-dianhydride (TCA) are added. The reaction mixture is stirred for 2 hours at 0° C. and then for 21 hours at room temperature. Thereafter, the reaction mixture is diluted with 18 ml of THF and is slowly poured into 800 ml of water to precipitate the polymer. The precipitated product is dried at 40° C. under vacuum for 24 hours to yield 2.76 g of polyamic acid (Designation PP-1) as a white solid. Intrinsic viscosity [η]=0.33 dL/g. Analogous to the procedure described in Photopolymer example PP1 the following polymers are prepared from the diamines and dianhydrides indicated in the following table:

| Photopolymer example | Diamine | Dianhydride | Intrinsic viscosity [η] |
|---|---|---|---|
| PP2 | PD2 | TCA | 0.50 dl/g |
| PP3 | PD2 + PD4 Mass ratio 95:5 | TCA | 0.48 dl/g |
| PP4 | PD2 + PD4 Mass ratio 90:10 | TCA | 0.48 dl/g |
| PP5 | PD2 + PD4 Mass ratio 80:20 | TCA | 0.33 dl/g |
| PP6 | PD2 + PD3 Mass ratio 90:10 | TCA | 0.39 dl/g |
| PP7 | PD2 + PD3 Mass ratio 80:20 | TCA | 0.31 dl/g |

Preparation of the Inventive Photoalignment Composition

The homopolymeric or copolymeric polyimide and polyamic acid compounds (I) are prepared as described above.

The photoactive compounds (II) comprising photoalignment groups may be prepared as described above.

General procedure: A solution of the required concentration is prepared by mixing the compounds (I) and (II) with the solvent or solvent mixture in the required weight ratios and stirring thoroughly until complete dissolution is attained. If required additives are added and the formulation according to the present invention is then filtered (Sartorius PTFE 0.2 μm) and used as described in the application examples.

Results (% concentrations are by weight):

| Example | Compound (I) (%) Compound (II) (%) | | Solvent 1 (%) Solvent 2 (%) Solvent 3 (%) Solvent 4 (%) | | Polymer concentration (%) | Solution quality |
|---|---|---|---|---|---|---|
| F1. | PAA-1 | 97 | NMP | 60 | 4.5 | ○ |
|  | PP2 | 3 | BC | 40 |  |  |
| F2.(comp.) | PAA-2 | 97 | NMP | 60 | 4.5 | ○ |
|  | PP2 | 3 | BC | 40 |  |  |
| F3. | PAA-1 | 90 | NMP | 60 | 4.5 | ○ |
|  | PP2 | 10 | BC | 40 |  |  |
| F4.(comp.) | PAA-2 | 90 | NMP | 60 | 4.5 | ○ |
|  | PP2 | 10 | BC | 40 |  |  |
| F5. | PAA-1 | 95 | NMP | 60 | 7.5 | ○ |
|  | PP2 | 5 | BC | 40 |  |  |
| F6. | PAA-1 | 97 | NMP | 25 | 4.5 | ○ |
|  | PP2 | 3 | GBL | 25 |  |  |
|  |  |  | DEE | 40 |  |  |
|  |  |  | MIAK | 10 |  |  |
| F7.(comp.) | PAA-2 | 97 | NMP | 25 | 4.5 | ○ |
|  | PP2 | 3 | GBL | 25 |  |  |
|  |  |  | DEE | 40 |  |  |
|  |  |  | MIAK | 10 |  |  |
| F8. | PAA-1 | 97 | NMP | 25 | 4.5 | ○ |
|  | PP2 | 3 | GBL | 25 |  |  |
|  |  |  | DEE | 40 |  |  |
|  |  |  | 2-Heptanone | 10 |  |  |
| F9.(comp.) | PAA-2 | 97 | NMP | 25 | 4.5 | ○ |
|  | PP2 | 3 | GBL | 25 |  |  |
|  |  |  | DEE | 40 |  |  |
|  |  |  | 2-Heptanone | 10 |  |  |
| F10. | PAA-1 | 97 | NMP | 25 | 4.5 | ○ |
|  | PP2 | 3 | GBL | 25 |  |  |
|  |  |  | DEE | 40 |  |  |
|  |  |  | 3-Heptanone | 10 |  |  |
| F11.(comp.) | PAA-2 | 97 | NMP | 25 | 4.5 | ○ |
|  | PP2 | 3 | GBL | 25 |  |  |
|  |  |  | DEE | 40 |  |  |
|  |  |  | 3-Heptanone | 10 |  |  |
| F12. | PAA-1 | 97 | NMP | 25 | 4.5 | ○ |
|  | PP2 | 3 | GBL | 25 |  |  |
|  |  |  | DEE | 40 |  |  |
|  |  |  | 4-Heptanone | 10 |  |  |
| F13.(comp.) | PAA-2 | 97 | NMP | 25 | 4.5 | ○ |
|  | PP2 | 3 | GBL | 25 |  |  |
|  |  |  | DEE | 40 |  |  |
|  |  |  | 4-Heptanone | 10 |  |  |
| F14. | PAA-1 | 97 | NMP | 25 | 4.5 | ○ |
|  | PP2 | 3 | GBL | 25 |  |  |
|  |  |  | DEE | 40 |  |  |
|  |  |  | 5-Methyl-3-Heptanone | 10 |  |  |
| F15.(comp.) | PAA-2 | 97 | NMP | 25 | 4.5 | ○ |
|  | PP2 | 3 | GBL | 25 |  |  |
|  |  |  | DEE | 40 |  |  |
|  |  |  | 5-Methyl-3-Heptanone | 10 |  |  |
| F16. | PAA-1 | 97 | NMP | 25 | 4.5 | ○ |
|  | PP2 | 3 | GBL | 25 |  |  |
|  |  |  | DEE | 40 |  |  |
|  |  |  | EEP | 10 |  |  |

-continued

| Example | Compound (I) (%) Compound (II) (%) | | Solvent 1 (%) Solvent 2 (%) Solvent 3 (%) Solvent 4 (%) | | Polymer concentration (%) | Solution quality |
|---|---|---|---|---|---|---|
| F17.(comp.) | PAA-2 | 97 | NMP | 25 | 4.5 | ○ |
| | PP2 | 3 | GBL | 25 | | |
| | | | DEE | 40 | | |
| | | | EEP | 10 | | |
| F18. | PAA-1 | 97 | NMP | 25 | 4.5 | ○ |
| | PP2 | 3 | GBL | 25 | | |
| | | | DEE | 40 | | |
| | | | Isoamylbutyrate | 10 | | |
| F19.(comp.) | PAA-1 | 97 | NMP | 25 | 4.5 | ○ |
| | PP2 | 3 | GBL | 25 | | |
| | | | DEE | 40 | | |
| | | | Isoamylbutyrate | 10 | | |
| F20. | PAA-1 | 95 | NMP | 25 | 4 | ○ |
| | PP2 | 5 | GBL | 25 | | |
| | | | DEE | 40 | | |
| | | | Isoamylbutyrate | 10 | | |
| F21. | PAA-1 | 97 | NMP | 25 | 4.5 | ○ |
| | PP2 | 3 | GBL | 25 | | |
| | | | DEE | 40 | | |
| | | | Butylal | 10 | | |
| F22. | PAA-1 | 95 | NMP | 25 | 4 | ○ |
| | PP2 | 5 | GBL | 25 | | |
| | | | DEE | 40 | | |
| | | | Butylal | 10 | | |
| F23. | PAA-1 | 95 | NMP | 25 | 4 | ○ |
| | PP2 | 5 | GBL | 25 | | |
| | | | DEE | 40 | | |
| | | | MIAK | 10 | | |
| F24. | PAA-1 | 95 | NMP | 25 | 4 | ○ |
| | PP2 | 5 | GBL | 25 | | |
| | | | DEE | 40 | | |
| | | | Propylal | 10 | | |
| F25. | PAA-1 | 95 | NMP | 25 | 4 | ○ |
| | PP2 | 5 | GBL | 25 | | |
| | | | DEE | 40 | | |
| | | | Diethylcarbonate | 10 | | |
| F26. | PAA-1 | 95 | NMP | 50 | 7.5 | ○ |
| | PP2 | 5 | BC | 30 | | |
| | | | EEP | 20 | | |
| F27. | PAA-1 | 95 | NMP | 50 | 7.5 | Δ |
| | PP2 | 5 | BC | 30 | | |
| | | | Butylal | 20 | | |
| F28. | PAA-1 | 95 | NMP | 50 | 7.5 | ○ |
| | PP2 | 5 | BC | 30 | | |
| | | | Propylal | 20 | | |
| F29. | PAA-1 | 95 | NMP | 50 | 7.5 | ○ |
| | PP2 | 5 | BC | 30 | | |
| | | | Isoamylbutyrate | 20 | | |
| F30. | PAA-1 | 95 | NMP | 50 | 7.5 | ○ |
| | PP2 | 5 | BC | 30 | | |
| | | | MIAK | 20 | | |
| F31. | PAA-13 | 97 | NMP | 25 | 4.5 | ○ |
| | PP2 | 3 | GBL | 25 | | |
| | | | DEE | 40 | | |
| | | | EEP | 10 | | |
| F32. | PAA-15 | 97 | NMP | 25 | 4.5 | ○ |
| | PP2 | 3 | GBL | 25 | | |
| | | | DEE | 40 | | |
| | | | EEP | 10 | | |

Symbol and Abbreviation List

○: Solution homogenous, clear and perfectly soluble

Δ: Solution turbid, not clear

X: Precipitation of the polymer

N-methyl-2-pyrrolidone (NMP), (gamma)-butyrolactone (GBL or BL), ethylene glycol mono butyl ether or butyl glycol or butyl cellosolve (BC), diethylene glycol diethyl ether (DEE or DEDG), 3-ethoxyethyl propionate (EEP), methyl isoamyl ketone (MIAK).

Application Examples

Cell Preparation and Evaluation.

A liquid crystal cell wherein the liquid crystals are aligned by the photoalignment coating layer of the present invention is prepared in the following manner:

A 4.5 weight % solution of compounds (I) and (II) is spin-coated onto two ITO coated glass substrates at a spin speed of 1600-2100 rpm for 30 seconds. After spin-coating, the substrates are subjected to a baking procedure consisting of pre-baking for 1.5 minutes at 80° C. and post-baking for 40 minutes at a temperature of 200° C. The resulting layer thickness is around 100 nm. The substrates with the coated polymer layer on top are exposed to linearly polarized UV light (LPUV) at an incidence angle of 40° relative to the normal of the substrate surface. The plane of polarization is within the plane spanned by the substrate normal and the propagation direction of the light. The applied exposure dose is 20 mJ/cm$^2$ at a wavelength of 280-330 nm. After LPUV exposure, a cell is assembled with the 2 substrates, the exposed polymer layers facing the inside of the cell. The substrates are adjusted relative to each other such that the induced alignment directions are parallel to each other (corresponds to the anti-parallel rubbed configuration in case of alignment by rubbing procedure). The cell is capillary filled with liquid crystal MLC-6610 (Merck KGA), which had a negative dielectric anisotropy. The filled cell is further subjected to a thermal annealing at 130° C. for 30 minutes, thereby completing the cell process.

Voltage holding ratio of this cell is measured at 60° C. The voltage decay V (at T=16.67 ms and T=1667 ms) of a voltage surge of 64 μs with $V_0$ (V at t=0)=1 V is then measured over a period of T=16.67 ms and T=1667 ms. The voltage holding ratio (VHR) is then determined, given by VHR (%)=$V_{rms}$ (t=T)/$V_0$*100.

Tilt angle is measured using the crystal rotation method. The liquid crystal orientation is determined by polarization microscopy.

Results:

| Example | Compound (I) (%) Compound (II) (%) | | Solvent 1 (%) Solvent 2 (%) Solvent 3 (%) Solvent 4 (%) | | VHR (%) 16.67 ms/ 1667 ms | Tilt angle | Orientation |
|---|---|---|---|---|---|---|---|
| A1 | PAA-1 | 97 | NMP | 60 | 99.50/95.20 | 88.62° | Homeotropic |
|  | PP2 | 3 | BC | 40 |  |  |  |
| A2 (comp.) | PAA-2 | 97 | NMP | 60 | 99.20/91.30 | 88.50° | Homeotropic |
|  | PP2 | 3 | BC | 40 |  |  |  |
| A3 | PAA-1 | 90 | NMP | 60 | 99.45/94.50 | 86.67° | Homeotropic |
|  | PP1 | 10 | BC | 40 |  |  |  |
| A4 (comp.) | PAA-2 | 90 | NMP | 60 | 99.20/91.52 | 87.60 | Homeotropic |
|  | PP1 | 10 | BC | 40 |  |  |  |
| A5 | PAA-1 | 97 | NMP | 25 | 99.35/93.48 | 88.54 | Homeotropic |
|  | PP2 | 3 | GBL | 25 |  |  |  |
|  |  |  | DEE | 40 |  |  |  |
|  |  |  | MIAK | 10 |  |  |  |
| A6 (comp.) | PAA-2 | 97 | NMP | 25 | 99.00/93.43 | 88.58° | Homeotropic |
|  | PP2 | 3 | GBL | 25 |  |  |  |
|  |  |  | DEE | 40 |  |  |  |
|  |  |  | MIAK | 10 |  |  |  |
| A7 | PAA-1 | 97 | NMP | 25 | 99.35/94.19 | 88.59 | Homeotropic |
|  | PP2 | 3 | GBL | 25 |  |  |  |
|  |  |  | DEE | 40 |  |  |  |
|  |  |  | 2-Heptanone | 10 |  |  |  |
| A8 (comp.) | PAA-2 | 97 | NMP | 25 | 99.07/93.58 | 88.57° | Homeotropic |
|  | PP2 | 3 | GBL | 25 |  |  |  |
|  |  |  | DEE | 40 |  |  |  |
|  |  |  | 2-Heptanone | 10 |  |  |  |
| A9 | PAA-1 | 97 | NMP | 25 | 99.30/93.65 | 88.56 | Homeotropic |
|  | PP2 | 3 | GBL | 25 |  |  |  |
|  |  |  | DEE | 40 |  |  |  |
|  |  |  | 3-Heptanone | 10 |  |  |  |
| A10 (comp.) | PAA-2 | 97 | NMP | 25 | 99.02/93.50 | 88.60° | Homeotropic |
|  | PP2 | 3 | GBL | 25 |  |  |  |
|  |  |  | DEE | 40 |  |  |  |
|  |  |  | 3-Heptanone | 10 |  |  |  |
| A11 | PAA-1 | 97 | NMP | 25 | 99.35/94.19 | 88.60 | Homeotropic |
|  | PP2 | 3 | GBL | 25 |  |  |  |
|  |  |  | DEE | 40 |  |  |  |
|  |  |  | 4-Heptanone | 10 |  |  |  |
| A12 (comp.) | PAA-2 | 97 | NMP | 25 | 99.07/93.14 | 88.62° | Homeotropic |
|  | PP2 | 3 | GBL | 25 |  |  |  |
|  |  |  | DEE | 40 |  |  |  |
|  |  |  | 4-Heptanone | 10 |  |  |  |
| A13 | PAA-1 | 97 | NMP | 25 | 99.30/94.45 | 88.64 | Homeotropic |
|  | PP2 | 3 | GBL | 25 |  |  |  |
|  |  |  | DEE | 40 |  |  |  |
|  |  |  | 5-Methyl3-Heptanone | 10 |  |  |  |
| A14 (comp.) | PAA-2 | 97 | NMP | 25 | 99.10/93.27 | 88.62° | Homeotropic |
|  | PP2 | 3 | GBL | 25 |  |  |  |
|  |  |  | DEE | 40 |  |  |  |
|  |  |  | 5-Methyl3-Heptanone | 10 |  |  |  |
| A15 | PAA-1 | 97 | NMP | 25 | 99.37/93.76 | 88.58 | Homeotropic |
|  | PP2 | 3 | GBL | 25 |  |  |  |
|  |  |  | DEE | 40 |  |  |  |
|  |  |  | EEP | 10 |  |  |  |
| A16 (comp.) | PAA-2 | 97 | NMP | 25 | 99.10/91.10 | 88.53° | Homeotropic |
|  | PP2 | 3 | GBL | 25 |  |  |  |
|  |  |  | DEE | 40 |  |  |  |
|  |  |  | EEP | 10 |  |  |  |

-continued

| Example | Compound (I) (%) Compound (II) (%) | | Solvent 1 (%) Solvent 2 (%) Solvent 3 (%) Solvent 4 (%) | | VHR (%) 16.67 ms/ 1667 ms | Tilt angle | Orientation |
|---|---|---|---|---|---|---|---|
| A17 | PAA-1 | 97 | NMP | 25 | 99.27/93.96 | 88.55 | Homeotropic |
|  | PP2 | 3 | GBL | 25 |  |  |  |
|  |  |  | DEE | 40 |  |  |  |
|  |  |  | Isoamylbutyrate | 10 |  |  |  |
| A18 | PAA-1 | 97 | NMP | 25 | 99.35/94.32 | 88.52 | Homeotropic |
|  | PP2 | 3 | GBL | 25 |  |  |  |
|  |  |  | DEE | 40 |  |  |  |
|  |  |  | Butylal | 10 |  |  |  |

With reference to the results in the table above, compound PAA-1 (Polymer example P1), which comprises repeating structural units from Diamine 1 carrying phenolic OH-groups, shows excellent voltage holding ratio performance in comparison to the compound PAA-2 (Polymer example 2), which comprises repeating structural units from Diamine 2 carrying no phenolic OH-groups. When compound PAA-1 is used in the composition together with a photopolymer compound (II), it doesn't disturb alignment of liquid crystals and maintains good homeotropic orientation.

The invention claimed is:

1. A liquid crystal photoalignment composition comprising:

a) at least one polyimide and/or polyamic acid compound (I) represented by the general Formula 1, comprising repeating structural units (1) and/or (2):

Formula 1

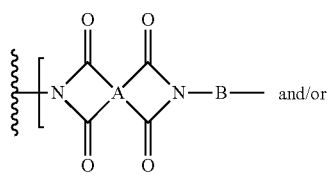
(1)

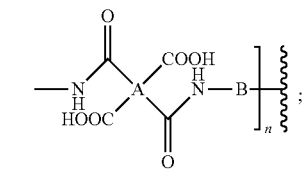
(2)

and/or a repeating structural unit represented by the general Formula 2, comprising repeating structural units (3) and/or (4):

Formula 2

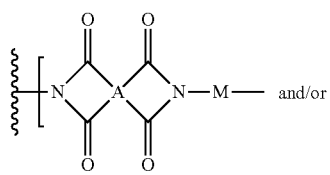
(3)

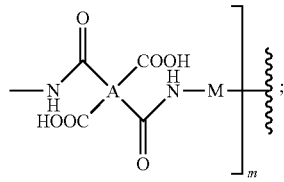
(4)

where

A is a tetravalent organic residue of a tetracarboxylic dianhydride,

B is the divalent residue of a substituted or unsubstituted non-aromatic or aromatic diamine $NH_2$—B—$NH_2$ without phenolic OH-groups, M is the divalent residue of a substituted or unsubstituted aromatic diamine $NH_2$-M-$NH_2$ carrying at least two phenolic OH-groups, n and m are integers and the sum n+m has a value from 10 to 200, where m is greater than 0 and n is equal to 0 or greater than 0, and under the proviso that at least 5 weight % of the aromatic diamine carrying phenolic OH groups $NH_2$-M-$NH_2$ are present in 100 weight % of compound (I), b) at least one photoactive compound (II) comprising photoalignment groups, c) a solvent or solvent mixture, d) optionally at least one additive, and the amount of compound (I) is 50%-99.5% by weight of the sum of weights of compound (I) and compound (II);

wherein the substituted or unsubstituted aromatic diamine carrying at least two phenolic OH groups $NH_2$-M-$NH_2$ is a bis-o-aminophenol carrying at least 2 phenolic OH groups and comprising 2 or 3 benzene rings in the molecular structure, where the phenolic OH groups are in para-position relative to the bridging group X and the amino groups are in ortho-position relative to the phenolic OH groups, as depicted in the following formulae:

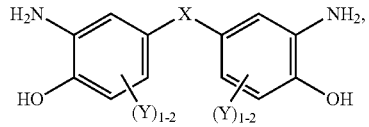

-continued

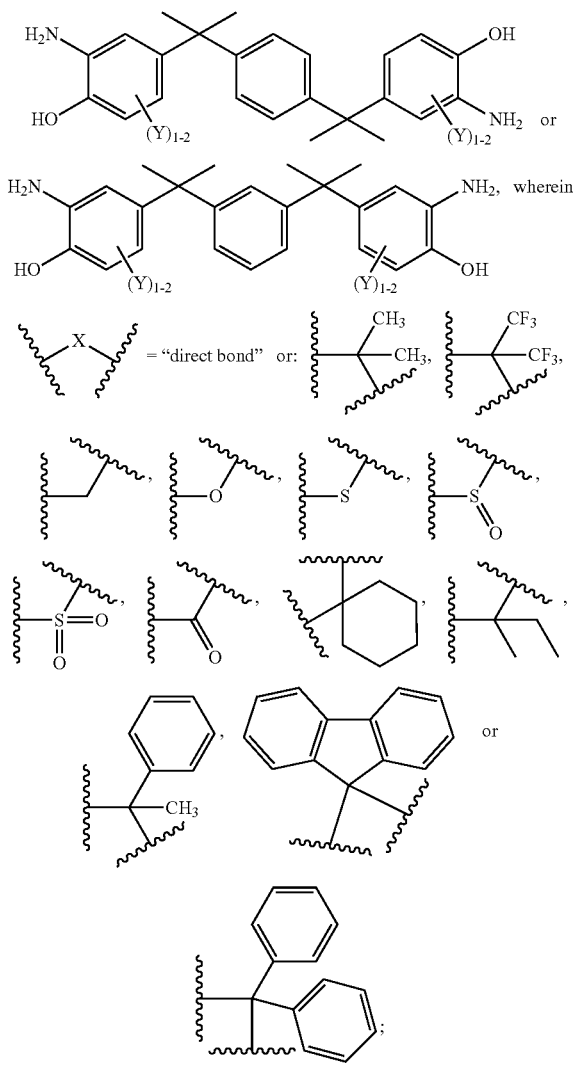

and wherein Y represents a hydrogen atom, $C_1$-$C_4$ alkyl group, $C_1$-$C_4$ alkoxy group, Cl, F, Br or I, and p represents an integer from 1-3.

2. The liquid crystal photoalignment composition according to claim 1, where the aromatic diamine carrying at least two phenolic OH groups $NH_2$-M-$NH_2$ is selected from the bis-o-aminophenol compounds selected from the group consisting of:

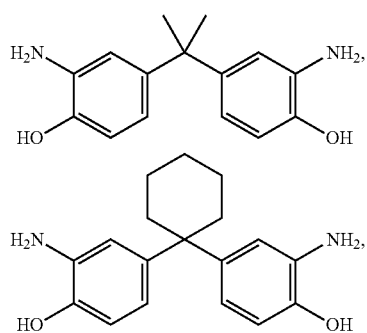

-continued

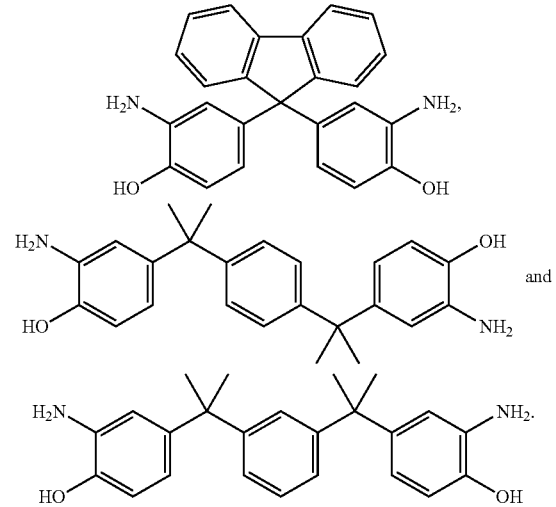

3. The liquid crystal photoalignment composition according to claim 1,
where the polyimide and/or polyamic acid compound (I) is a copolymer comprising at least one molecular type of dianhydride and at least two molecular types of diamines, one being of the type $NH_2$—B—$NH_2$ without phenolic OH groups and one being $NH_2$-M-$NH_2$ carrying at least two phenolic OH groups, under the proviso that the amount of diamine $NH_2$-M-$NH_2$ is 10% by weight relative to the total amount of diamines.

4. The liquid crystal photoalignment composition according to claim 1, where the polyimide and/or polyamic acid compound (I) comprises at least one molecular type of dianhydride and one molecular type of diamine $NH_2$-M-$NH_2$ containing phenolic OH groups.

5. The liquid crystal photoalignment composition according to claim 1, where the compound (I) is a block copolymer comprising recurring block units . . . [Block]$_b$ . . . [Block C]$_c$ . . .

where Block B comprises prepolymerized recurring structural units from at least one molecular type of dianhydride and at least one molecular type of diamine $NH_2$—B—$NH_2$ without phenolic OH-groups, according to Formula 3:

Formula 3

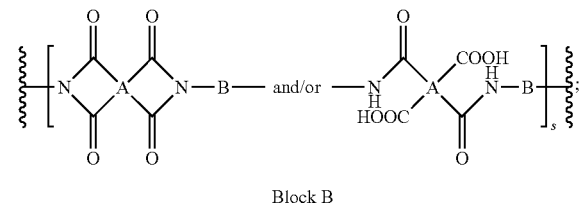

Block B and Block C comprises prepolymerized recurring structural units from at least one molecular type of dianhydride and at least one molecular type of diamine $NH_2$-M-$NH_2$ containing phenolic OH-groups, according to Formula 4:

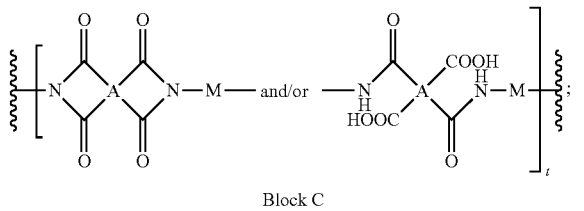

Formula 4

Block C where A, B and M have the same meaning as given in claim 1 and s, t, are integers indicating the number of recurring units in Block B and Block C, such that b*s+c*t is a value of 10 to 1000, under the proviso that at least 10 weight % of the recurring units of the Block C are present in 100 weight % of compound (I).

6. The liquid crystal photoalignment composition according to claim 1, where the photoactive compound (II) comprising photoalignment groups is a monomer, oligomer, dendrimer, prepolymer or copolymer, where the photoalignment groups comprise functional groups selected from the group consisting of:
- cinnamates, chalcones,
- coumarines, quinolones, and
- stilbenes,
- where these functional groups can be unsubstituted or comprise substituents selected from the group consisting of:
- fluorine, chlorine, bromine, cyano, $C_1$-$C_4$-alkoxy, carboxylic acid, ester groups with linear or branched $C_1$-$C_{12}$ alkyl, optionally substituted with fluorine or cyano groups, linear or branched alkyl and cycloalkyl groups with 1-12 C atoms, optionally substituted with fluorine or cyano groups, and aromatic groups with 6-18 C atoms optionally substituted with fluorine or cyano groups.

7. The liquid crystal photoalignment composition according to claim 1, where the photoactive compound (II) comprising photoalignment groups is an oligomer, polymer or copolymer.

8. The liquid crystal photoalignment composition according to claim 1, where the photoactive compound (II) comprising photoalignment groups is a polyimide and/or polyamic acid oligomer or polymer.

9. A method of preparation of the liquid crystal photoalignment composition according to claim 1, comprising mixing and/or blending together the components a) to d), providing the composition according to claim 1 for using it as a photoalignment film or coating material to align liquid crystalline compounds to fabricate structured or unstructured optical and electro-optical elements and devices.

10. A photoalignment film or coating layer prepared by the processes of
  a) applying the composition according to claim 1 on a substrate to form a liquid crystal alignment film or coating layer,
  b) optionally drying,
  c) optionally heating the coated layer at 80° C. to 230° C.,
  d) photoirradiating the photoalignment film or coating layer prepared via steps a) to c) with aligning light of a suitable wavelength to induce the anisotropy in the film or coating layer.

11. A photoalignment film or coating layer comprising a composition according to claim 1.

12. A method of using the photoalignment film or coating layer according to claim 11, comprising aligning liquid crystalline compounds with said photoalignment film or coating layer to fabricate structured or unstructured optical and electro-optical elements and devices.

13. Structured or unstructured optical and electro-optical elements and devices comprising the photoalignment film or coating layer according to claim 11.

* * * * *